(12) United States Patent
Rizvi

(10) Patent No.: US 12,158,993 B2
(45) Date of Patent: *Dec. 3, 2024

(54) INPUT DEVICE

(71) Applicant: Razer (Asia-Pacific) Pte. Ltd., Singapore (SG)

(72) Inventor: Farrukh Raza Rizvi, Singapore (SG)

(73) Assignee: Razer (Asia-Pacific) Pte. Ltd., Singapore (SG)

( * ) Notice: Subject to any disclaimer, the term of this patent is extended or adjusted under 35 U.S.C. 154(b) by 0 days.

This patent is subject to a terminal disclaimer.

(21) Appl. No.: 18/219,892

(22) Filed: Jul. 10, 2023

(65) Prior Publication Data

US 2023/0359285 A1 Nov. 9, 2023

Related U.S. Application Data

(63) Continuation of application No. 18/082,280, filed on Dec. 15, 2022, now Pat. No. 11,740,708, which is a continuation of application No. 17/666,484, filed on Feb. 7, 2022, now Pat. No. 11,604,519, which is a continuation-in-part of application No. 17/030,211, filed on Sep. 23, 2020, now Pat. No. 11,243,623,
(Continued)

(51) Int. Cl.
*G06F 3/03* (2006.01)
*G06F 3/0354* (2013.01)
*G06F 3/0362* (2013.01)

(52) U.S. Cl.
CPC .................. *G06F 3/0312* (2013.01)

(58) Field of Classification Search
CPC .................................................. G06F 3/0362
See application file for complete search history.

(56) References Cited

U.S. PATENT DOCUMENTS 5,696,537 A * 12/1997 Solhjell ............... G06F 3/03543
345/167
6,380,927 B1  4/2002 Ostrum et al.
(Continued)

FOREIGN PATENT DOCUMENTS

CN  202221555 U  5/2012
CN  103049112 A  4/2013

OTHER PUBLICATIONS

International Search Report and Written Opinion dated Feb. 21, 2018 for corresponding International Application No. PCT/SG2017/050299 (20 pages).
(Continued)

*Primary Examiner* — Sepehr Azari
(74) *Attorney, Agent, or Firm* — Posinelli PC

(57) ABSTRACT

An input device may include a housing, a scroll wheel having an arresting surface, and a lever pivotable about a pivot axis between first and second lever arms of the lever for moving a first free end portion of the first lever arm to engage or disengage the arresting surface. The input device may further include a motion converter in engagement with a second free end portion of a second lever arm. The motion converter configured to convert a rotational movement of a rotary member of the motion converter into an output motion to move the second free end portion of the second lever arm so as to pivot the lever about the pivot axis for engaging or disengaging the first free end portion of the first lever arm and the arresting surface of the scroll wheel.

19 Claims, 15 Drawing Sheets

Related U.S. Application Data which is a continuation-in-part of application No. 16/619,739, filed as application No. PCT/SG2017/050299 on Jun. 13, 2017, now Pat. No. 10,838,524.

(56) References Cited

U.S. PATENT DOCUMENTS

| | | | |
|---|---|---|---|
| 6,940,488 | B1 | 9/2005 | Siddiqui et al. |
| 6,987,505 | B1 | 1/2006 | Koo |
| 7,061,471 | B2 | 6/2006 | Bohn |
| 7,075,516 | B2 | 7/2006 | Bohn |
| 7,079,110 | B2 | 7/2006 | Ledbetter et al. |
| 8,446,366 | B2 * | 5/2013 | Blandin .............. G06F 3/03543 345/157 |
| 8,803,804 | B2 | 8/2014 | Kao |
| 9,389,705 | B2 | 7/2016 | Young et al. |
| 11,604,519 | B2 | 3/2023 | Rizvi |
| 2003/0201979 | A1 | 10/2003 | Sandage et al. |
| 2006/0001657 | A1 * | 1/2006 | Monney .............. G06F 3/03543 345/184 |
| 2006/0033716 | A1 | 2/2006 | Rosenberg et al. |
| 2006/0082551 | A1 | 4/2006 | Chang et al. |
| 2006/0250364 | A1 | 11/2006 | Gorbunov |
| 2007/0188453 | A1 | 8/2007 | O'Sullivan |
| 2011/0227828 | A1 * | 9/2011 | Blandin .............. G06F 3/03543 345/163 |
| 2013/0321272 | A1 * | 12/2013 | Deng .................... G06F 3/0362 345/163 |
| 2014/0333536 | A1 | 11/2014 | Tee et al. |
| 2015/0363014 | A1 | 12/2015 | Wang et al. |
| 2017/0262083 | A1 * | 9/2017 | Huang .................... G06F 3/016 |
| 2018/0267629 | A1 * | 9/2018 | Lin ....................... G06F 3/0362 |
| 2018/0345136 | A1 * | 12/2018 | Schmitz ................ G06F 3/0362 |
| 2019/0094991 | A1 * | 3/2019 | Tsai ....................... G06F 3/0362 |
| 2020/0004352 | A1 * | 1/2020 | McLoughlin ........... G06F 3/038 |
| 2020/0159341 | A1 | 5/2020 | Unnikrishnan et al. |
| 2021/0004091 | A1 | 1/2021 | Rizvi et al. |
| 2022/0155879 | A1 | 5/2022 | Rizvi |

OTHER PUBLICATIONS

"Saitek Cyborg Mouse User Manual" [http://www.saitek.com/manuals/cyborg%20_mouse_manual.pdf], 2008(15 pages).

"Logitech MX Master Wireless Mouse" [http://www.logitech.com/en-US/product/mx-master] 2017 (10 pages).

* cited by examiner

INPUT DEVICE

CROSS-REFERENCE TO RELATED APPLICATIONS

This application is a continuation of and claims the benefit of U.S. application Ser. No. 18/082,280, filed on Dec. 15, 2022, which is a continuation-in-part of and claims the benefit of U.S. application Ser. No. 17/666,484, filed on Feb. 7, 2022, now U.S. Pat. No. 11,604,519, which is a continuation-in-part of U.S. patent application Ser. No. 17/030,211, filed Sep. 23, 2020, now U.S. Pat. No. 11,243,623, which is a continuation-in-part of and claims the benefit of U.S. patent application Ser. No. 16/619,739, filed Dec. 5, 2019, now U.S. Pat. No. 10,838,524, which is a National Phase Application under 35 U.S.C. § 371 of PCT/SG2017/050299, filed Jun. 13, 2017, which published as WO 2018/231145 on Dec. 20, 2018, All of which are expressly incorporated by reference herein in their entireties.

TECHNICAL FIELD

Embodiments generally relate to an input device, and particularly an input device with a scroll wheel.

BACKGROUND

Input devices for communication with a processor-based device generally include mice, track balls, joysticks, hand-held controllers, touch pads, keyboards, or the like. These input devices are typically used to provide inputs to the processor-based device such that a user may interact with a graphical user interface (GUI) of an application running on the processor-based device. The input devices may include a scroll wheel for the user to scroll through lines of texts or various graphical objects in a page of the application. The conventional scroll wheel typically only allows scrolling at a single constant speed and/or a single lever of resistive force. However, depending on the type of applications the user is using, for example from gaming applications to document processing applications, the input device with the single speed and/or the single lever of resistive force of scroll wheel may not be sufficient to allow the user to optimize the performance of the respective applications because the desirable scroll speed for the user using the different applications may vary from application to application.

SUMMARY

According to various embodiments, there may be provided an input device for communication with a processor-based device. The input device may include a housing. The input device may further include a scroll wheel which may be rotatably mounted on the housing in a manner such that a part of the scroll wheel may be exposed from the housing for a user of the input device to access the exposed part of the scroll wheel to scroll the scroll wheel. The scroll wheel may include a ring portion having an arresting surface being an inner surface of the ring portion of the scroll wheel. The input device may further include a lever which may be provided with first and second lever arms. The lever may be mounted on the housing so as to be pivotable about a pivot axis which extends between the first and second lever arms. The lever may be pivotable to move a first free end portion of the first lever arm to engage with the arresting surface of the scroll wheel for the scroll wheel to be in the resistive-wheeling mode and to disengage from the arresting surface of the scroll wheel for the scroll wheel to be in the free-wheeling mode. The input device may further include a motion converter which may be in engagement with a second free end portion of the second lever arm. The motion converter may include a rotary member rotatable about a rotational axis. The motion converter may be configured to convert a rotational movement of the rotary member into an output motion to move the second free end portion of the second lever arm so as to pivot the lever about the pivot axis for engaging or disengaging the first free end portion of the first lever arm and the arresting surface of the scroll wheel. The pivot axis of the lever and the rotational axis of the rotary member of the motion converter may be at least substantially parallel to each other.

BRIEF DESCRIPTION OF THE DRAWINGS

In the drawings, like reference characters generally refer to the same parts throughout the different views. The drawings are not necessarily to scale, emphasis instead generally being placed upon illustrating the principles of the invention. In the following description, various embodiments are described with reference to the following drawings, in which:

FIG. 12B.

DETAILED DESCRIPTION

Figure 1A:
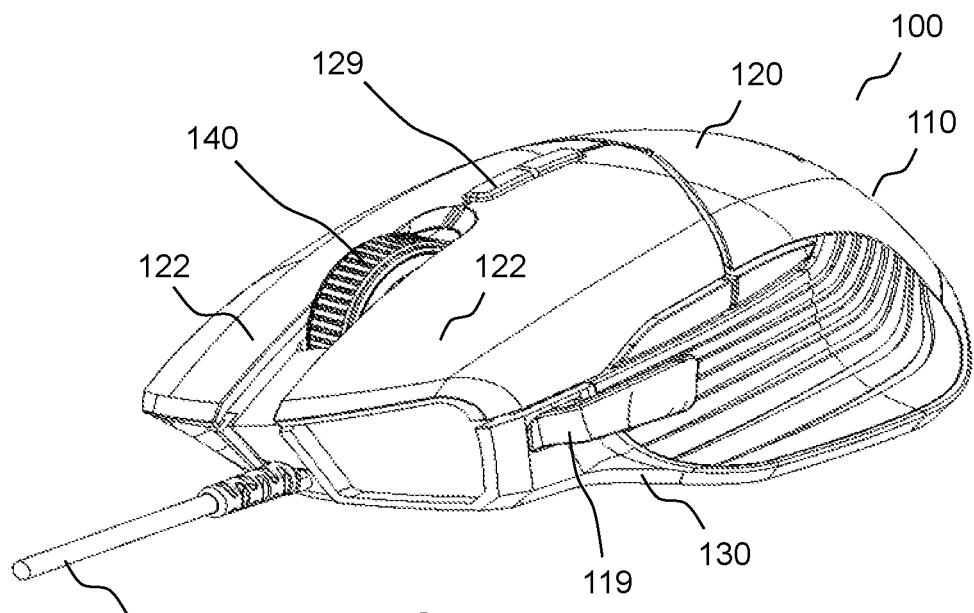
FIG. 1A shows a perspective front view of an input device, in the form of a mouse, for communication with a processor-based device according to various embodiments.

Embodiments described below in context of the apparatus are analogously valid for the respective methods, and vice versa. Furthermore, it will be understood that the embodiments described below may be combined, for example, a part of one embodiment may be combined with a part of another embodiment.

It should be understood that the terms "on", "over", "top", "bottom", "down", "side", "back", "left", "right", "front", "lateral", "side", "up", "down" etc., when used in the following description are used for convenience and to aid understanding of relative positions or directions, and not intended to limit the orientation of any device, or structure or any part of any device or structure. In addition, the singular terms "a", "an", and "the" include plural references unless context clearly indicates otherwise. Similarly, the word "or" is intended to include "and" unless the context clearly indicates otherwise.

Various embodiments of an input device for communication with a processor-based device, such as a computer, have been provided to address at least some of the issues identified earlier.

Various embodiments of an input device for communication with a processor-based device may include a scroll wheel and a user adjustable roller on a base of the input device that allows a user to smoothly or gradually vary a detent force acting on the scroll wheel over a range from a predetermined maximum detent force to zero detent force (or free-wheeling). Accordingly, the user adjustable roller may be configured to interact with the scroll wheel such that the scroll wheel may have a smooth transition from the predetermined maximum detent force to the zero detent force. Hence, the detent force acting on the scroll wheel may be adjusted by the user to a desired force that may be equal to the predetermined maximum detent force, or equal to the zero detent force, or of any magnitude between the predetermined maximum detent force and zero detent force. In other words, the input device of the various embodiments may include a mechanism or means for the user to provide an input motion (e.g. a rotary input motion via the user adjustable roller, or an electric motor, or a click or push motion via an input button or push-button) such that the user may switch the scroll wheel between a resistive-wheeling mode and a free-wheeling mode. Further, in the resistive-wheeling mode, the mechanism or means may allow the user to provide the input motion (e.g. rotary input motion, or click or push motion) for adjusting or varying the detent force so as to adjust the resistance of the scroll wheel.

According to various embodiments, the user may adjust a ratchet mechanism, via rotating the roller, in order to provide the rotary input motion or generate a rotational movement to achieve a finer control over the detent force exerted on the scroll wheel. The ratchet mechanism may be on the base of the input device. According to various embodiments, the user may adjust the ratchet mechanism, via pushing a button to rotate a rotary member of the ratchet mechanism such that rotating the rotary member may adjust the detent force exerted on the scroll wheel.

Various embodiments of an input device for communication with a processor-based device may include a scroll wheel and a roller wheel as the mechanism or means for providing the rotary input motion. The roller wheel may be partially engageable by the user through a recess on the base of the mouse, and connected to a slider mechanism that converts rotary motion or rotational movement to an output motion (e.g. linear motion) to engage the scroll wheel. The roller wheel may allow the user easier access and finer control over force exerted on the scroll wheel.

Various embodiments of an input device for communication with a processor-based device may include a detent mechanism having a roller wheel for providing the rotary input motion or generating a rotational movement, a slider mechanism and a lever spring. The detent mechanism may convert the rotary motion or rotational movement of the roller wheel to an output motion (e.g. linear motion) for controlling a detent force exerted on the scroll wheel or to switch between the resistive-wheeling mode and the free-wheeling mode.

Various embodiments for an input device for communication with a processor-based device may include a detent mechanism having a rotary member that may be rotatable about a rotational axis. The detent mechanism may convert a rotational movement of the rotary member into an output motion for controlling a detent force exerted on the scroll wheel or to switch between the resistive-wheeling mode and the free-wheeling mode.

Figure 1B:
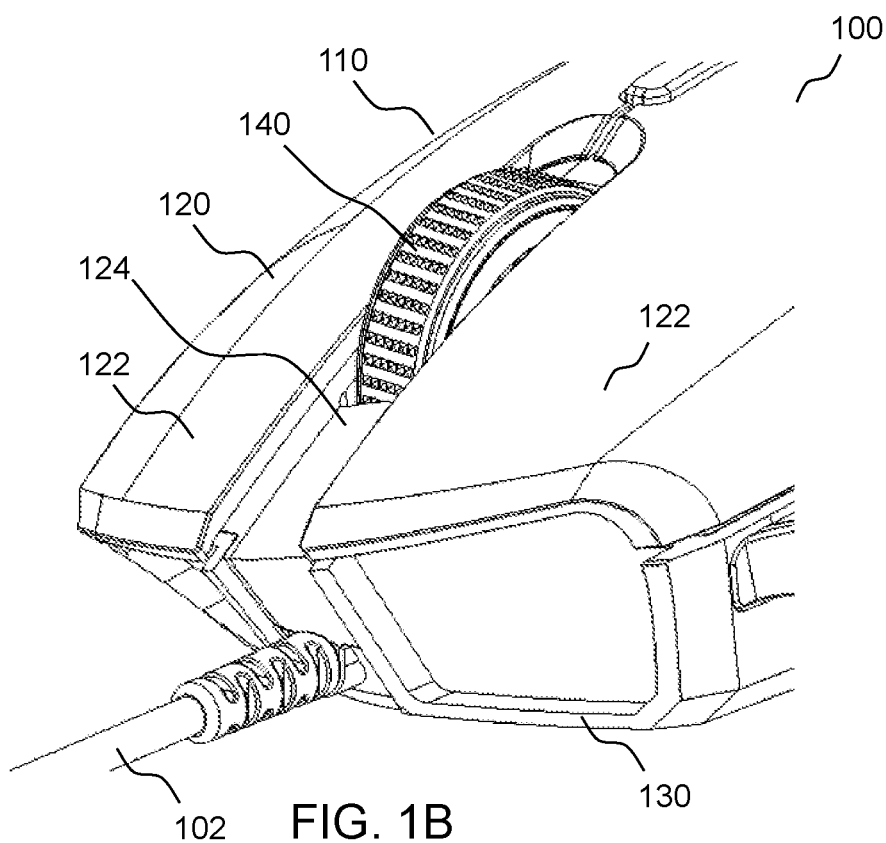
FIG. 1B shows an enlarged perspective front view of a front portion of the mouse of FIG. 1A according to various embodiments.

FIG. 1A shows a perspective front view of an input device, in the form of a mouse 100, for communication with a processor-based device according to various embodiments. FIG. 1B shows an enlarged perspective front view of a front portion of the mouse 100 of FIG. 1A according to various embodiments. In addition of being in the form of the mouse 100 as illustrated in the various drawings, the input device according to various embodiments may also be in the form of a track ball, a joystick, a handheld controller, a touch pad, a keyboard, a computer mouse or the like.

As shown in FIG. 1A and FIG. 1B, the input device in the form of the mouse 100 may include a housing 110. The housing 110 may be an exterior casing of the mouse 100. Further, the housing 110 may include a cover portion 120 and a base portion 130. The cover portion 120 and the base portion 130 may be two separate parts of the housing 110. The cover portion 120 of the housing 110 may be a top case cover of the exterior casing of the mouse 100. The base portion 130 of the housing 110 may be a bottom case cover of the exterior casing of the mouse 100. According to various embodiments, when the cover portion 120 and the base portion 130 are assembled together, the housing 110 may define an inner cavity to house or encase internal components of the mouse 100.

According to various embodiments, the internal components of the mouse 100 may include an electronic circuit assembly, a motion detection assembly, as well as various mechanical assembly configured for operating the mouse 100. The electronic circuit assembly may include printed circuit boards, or any other suitable electronic circuit. The electronic circuit assembly may be connected to the processor-based device, such as a computer, via a cable 102. The motion detection assembly may include optical sensors, or laser sensors, or track ball mechanism, or any other electronic or mechanical components that may be configured to detect movement of the mouse 100. The motion detection assembly may further be configured to be in communication with the electronic circuit module such that the detected movement of the mouse may be transmitted to the processor-based device, which the mouse 100 may be connected to.

Further, the cover portion 120 of the housing 110 may include one or more buttons 122. The one or more buttons 122 may be configured to interact with the electronic circuit assembly of the mouse 100 for a user to provide inputs to the processor-based device, which the mouse 100 may be connected to, via clicking of the one or more buttons. The one or more buttons 122 may include a click button, or a push button, or any combination of suitable buttons. The one or more buttons 122 may be located at any desired region of the cover portion 120 as desired.

As shown in FIG. 1A and FIG. 1B, the mouse 100 may include a scroll wheel 140. According to various embodiments, the scroll wheel 140 may be configured for a user to perform scrolling of a page of an application running in the processor-based device which the mouse 100 is connected to. For example, the user may use the scroll wheel 140 to scroll through lines of texts or various graphical objects in the page of the application. As shown in FIG. 1A and FIG. 1B, the scroll wheel 140 may be mounted (e.g. rotatably mounted) on the housing 110 in a manner so as to be rotatable about a first axis 141 (FIG. 4C) and so as to be partly exposed from the housing 110 to be accessible by a user of the mouse 100. In other words, the scroll wheel 140 may be rotatably mounted on the housing 110 in a manner such that a part or a portion of the scroll wheel 140 is exposed from the housing 110 for the user of the mouse 100 (i.e. input device) to access the exposed part of the scroll wheel 140 to scroll the scroll wheel 140. Accordingly, the scroll wheel 140 may be rotatably mounted to the cover portion 120 of the housing 110 of the mouse 100. Further, a portion of the scroll wheel 140 may be exposed through a cover surface 124 of the cover portion 120 of the housing 110 of the mouse 100. Furthermore, the scroll wheel 140 may be located between two main buttons 122 at a front portion of the cover surface 124 of the cover portion 120 of the housing 110 of the mouse 100. The scroll wheel 140 may also be at least substantially perpendicular to the cover surface 124 of the cover portion 120 of the housing 110 of the mouse 100 such that the first axis 141, which is the axis of rotation of the scroll wheel 140, may be at least substantially parallel to a portion of the cover surface 124 of the cover portion 120 which the scroll wheel 140 may be mounted to. Accordingly, the user may rotate the scroll wheel 140 by stroking a finger along a circumference of the scroll wheel 140 along the cover surface 124 of the cover portion 120 of the housing 110 of the mouse 100.

According to various embodiments, the scroll wheel 140 may also be mounted to other portions or surfaces of the housing 110 of the mouse 100. For example, the scroll wheel 140 may be mounted to a side portion or a side surface of the housing 110.

Figure 2A:
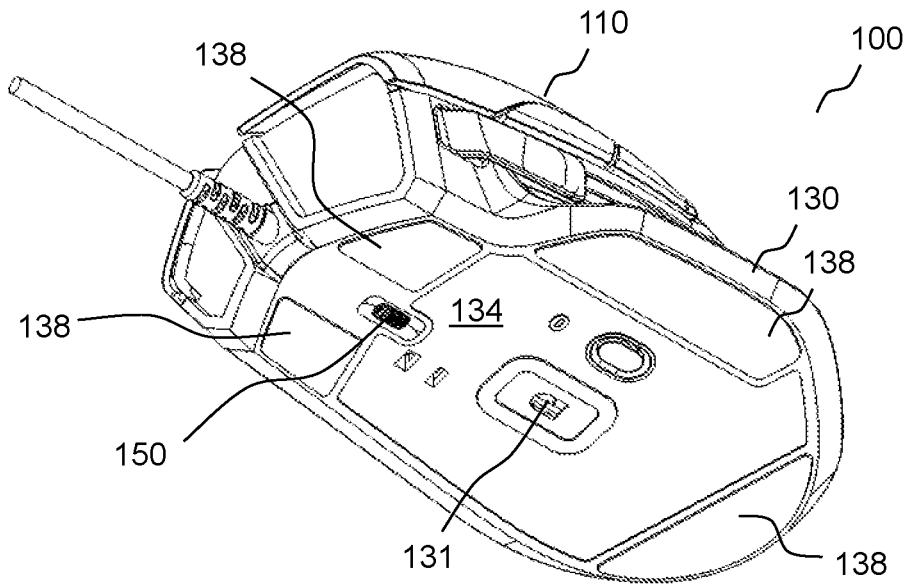
FIG. 2A shows a perspective bottom view of the mouse of FIG. 1A according to various embodiments.
Figure 2B:
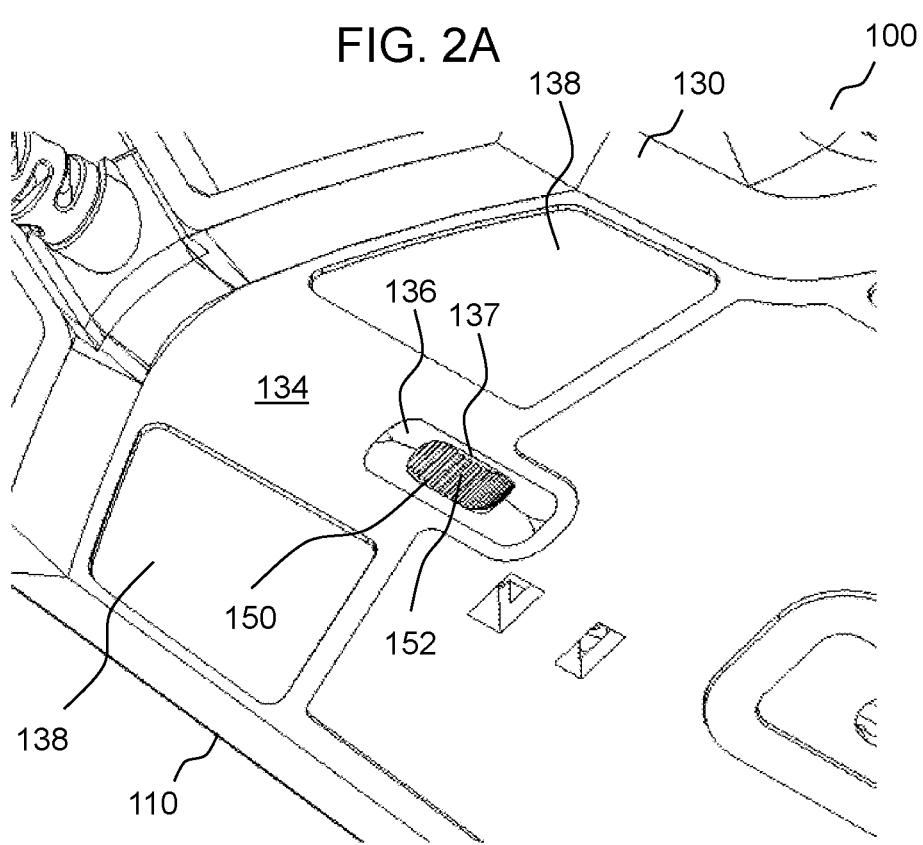
FIG. 2B shows an enlarged bottom front view of a front bottom portion of the mouse of FIG. 1A according to various embodiments.

FIG. 2A shows a perspective bottom view of the mouse 100 of FIG. 1A according to various embodiments. FIG. 2B shows an enlarged bottom front view of a front bottom portion of the mouse 100 of FIG. 1A according to various embodiments.

As shown in FIG. 2A and FIG. 2B, the housing 110 of the mouse 100 may include a base surface 134 at the base portion 130 of the housing 110. The base surface 134 may be configured to face a tracking surface on which the mouse 100 may be placed on. Accordingly, the base surface 134 of the housing 110 may be an exterior surface of a substantially flat section of the base portion 130 of the housing 110. Thus, the mouse 100 may be placed with the base surface 134 of the base portion 130 of the housing 110 substantially flat against or substantially parallel to a mouse pad, a table top, or any other suitable tracking surfaces on which the mouse may be used.

Further, the base portion 130 of the housing 110 of the mouse 100 may include a window 131. The window 131 may be an opening or a transparent portion of the base portion 130. Accordingly, the window 131 may allow the motion detection assembly of the mouse 100 to detect relative movement between the mouse 100 and the tracking surface on which the mouse 100 may be placed and moved.

As shown in FIG. 2A and FIG. 2B, the mouse 100 may also include an auxiliary wheel 150. According to various embodiments, the auxiliary wheel 150 may be configured to allow a user to gradually vary or adjust a rolling resistance of the scroll wheel 140 ranging from a free-wheeling to a predetermined maximum resistive-wheeling via rotating the auxiliary wheel 150. Accordingly, the auxiliary wheel 150 may be configured to allow a user to control an arresting force exerting on the scroll wheel 140 to achieve a finer control over the rolling resistance of the scroll wheel 140 via rotating the auxiliary wheel 150. Hence, the arresting force exerting on the scroll wheel 140 may be adjusted or varied, for example be increased or decreased, by the user via rotating the auxiliary wheel 150 to a desired arresting force having a magnitude in a range from zero arresting force to a predetermined maximum arresting force. In this manner, the auxiliary wheel 150 may also allow the user to switch from the free-wheeling mode, i.e. zero arresting force, to the resistive-wheeling mode (or adjustable resistive-wheeling mode).

Referring to FIG. 2A and FIG. 2B, the auxiliary wheel 150 may be mounted on the housing 110 in a manner so as to be rotatable about a second axis 151 (FIG. 4C) and so as to be partly exposed from the housing 110 to be accessible by the user. Accordingly, the auxiliary wheel 150 may be rotatably mounted to the base portion 130 of the housing 110 of the mouse 100. Further, a portion 152 of the auxiliary wheel 150 may be exposed through the base surface 134 of the base portion 120 of the housing 110 of the mouse 100. The auxiliary wheel 150 may also be at least substantially perpendicular to the base surface 134 of the base portion 130 of the housing 110 of the mouse 100 such that the second axis 151, which is the axis of rotation for the auxiliary wheel 150, may be at least substantially parallel to the base surface 134 of the base portion of the housing 110 of the mouse 100.

Further, the base surface 134 of the base portion 130 of the housing 110 of the mouse 100 may include a recess 136 and an opening 137 in the recess 136. Accordingly, the portion 152 of the auxiliary wheel 150 may be exposed or bared through the opening 137 of the base surface 134 of the housing 110 and a substantial portion of the auxiliary wheel 150 may remain within the cavity enclosed by the housing 110 of the mouse 100.

According to various embodiments, the portion 152 of the auxiliary wheel 150 may protrude or project from the opening 137 into the recess 136 without jutting out of the base surface 134. Accordingly, the user may press a finger into the recess 136 to contact the portion 152 of the auxiliary wheel 150 so as to rotate the auxiliary wheel 150 to adjust the scrolling mode of the scroll wheel 140 and/or to control the rolling resistance/arresting force of the scroll wheel 140.

According to various other embodiments, the portion 152 of the auxiliary wheel 150 of the mouse 100 may protrude or project from the opening 137 through the recess 136 and jut out from the base surface 134. Accordingly, an exposed portion 152 of the auxiliary wheel 150 may protrude from the housing 110. Hence, the user may press the mouse 100 against the tracking surface such that the portion 152 of the auxiliary wheel 150 may contact the tracking surface so as to move the mouse 100 to rotate the auxiliary wheel 150 to adjust the scrolling mode of the scroll wheel 140 and/or to control the rolling resistance/arresting force of the scroll wheel 140.

According to various other embodiments, the auxiliary wheel 150 may also be mounted to other portions or surfaces of the housing 110 of the mouse 100. For example, the auxiliary wheel 150 may be mounted to a side portion or a side surface of the housing 110.

Referring back to FIG. 2A and FIG. 2B, the mouse 100 may include one or more (e.g., a plurality of) mouse foot protrusions 138 projecting from the base surface 134 of the base portion 130 of the housing 110. The one or more mouse foot protrusions 138 may be configured for directly contacting the tracking surface on which the mouse 100 may be placed and moved, and the one or more mouse foot protrusions 138 may be configured to facilitate gliding or sliding of the mouse 100 over the tracking surface. According to various embodiments, the one or more mouse foot protrusions 138 may be made of polytetrafluoroethylene.

According to various embodiments, the one or more mouse foot protrusions 138 may be attached to the base surface 134 of the housing 110 via adhesive or any other suitable fastening means. According to various other embodiments, the one or more mouse foot protrusions 138 may be integrally molded with the base portion 130 and forming a portion of the base portion 130 of the housing 110.

According to various embodiments, the one or more mouse foot protrusions 138 may be configured to be compressible and a height of the one or more mouse foot protrusions may be greater than a protrusion height of the portion 152 of the auxiliary wheel 150 protruding and measuring from the base surface 134 of the base portion 130 of the housing 110 of the mouse 100. Accordingly, during a normal use of the mouse 100, the one or more mouse foot protrusions 138 may offset the base surface 134 of the base portion 130 of the housing 110 from the tracking surface such that the portion 152 of the auxiliary wheel 150 protruding from the base surface 134 of the base portion 130 of the housing 110 may not contact the tracking surface. Further, when the mouse 100 is pressed against the tracking surface, the one or more mouse foot protrusions 138 may be compressed such that the portion 152 of the auxiliary wheel 150 may then come into contact with the tracking surface. Accordingly, the auxiliary wheel 150 may then be rotated via pressing and moving the mouse 100 across the tracking surface for adjusting the scrolling mode of the scroll wheel 140 or controlling the rolling resistance/arresting force of the scroll wheel 140.

As shown in FIG. 2A and FIG. 2B, the mouse 100 may include four mouse foot protrusions 138 projecting from the base surface 134. According to various embodiments, the mouse 100 may include one, or two, or three, or four, or five, or six, or any number of mouse foot protrusions 138. Further, the one or more mouse foot protrusions 138 may be of any suitable shape, for example, a quadrilateral shape, or an oval shape, or an elliptical shape, or a crescent shape, or an annular shape, or any other suitable shapes.

Figure 3A:
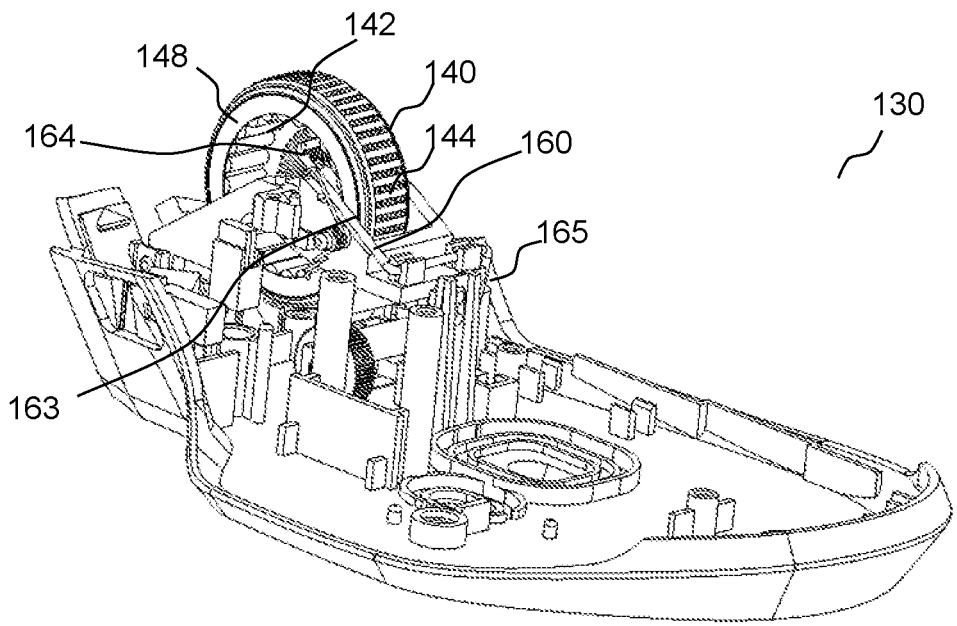
FIG. 3A shows a perspective view of a base portion of a housing of the mouse of FIG. 1A according to various embodiments.
Figure 3B:
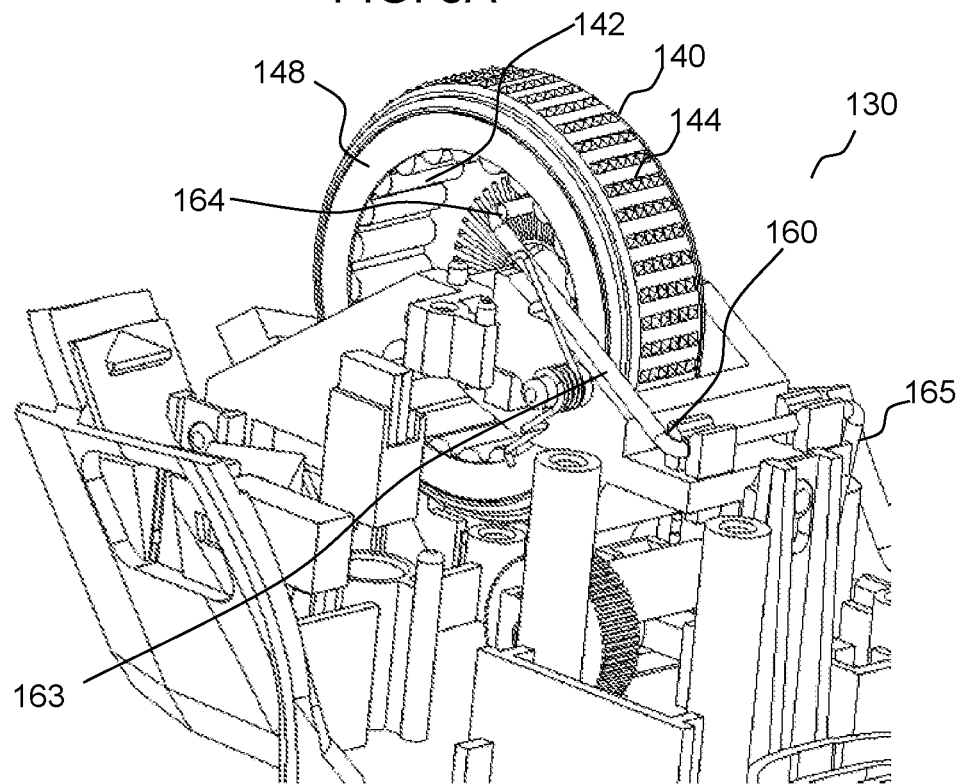
FIG. 3B shows an enlarged view of a front portion of the base portion of the housing of FIG. 3A according to various embodiments.
Figure 3C:
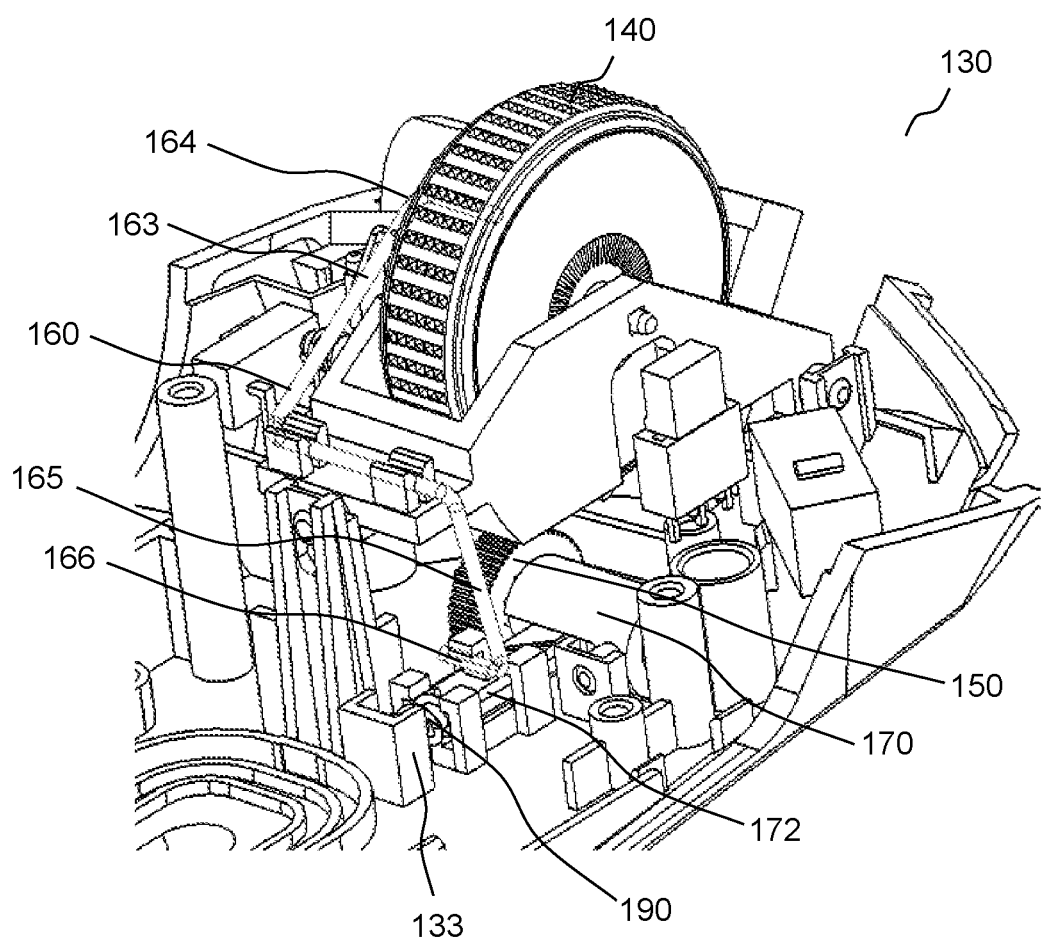
FIG. 3C shows another enlarged view of a front portion of the base portion of the housing of FIG. 3A according to various embodiments.

FIG. 3A shows a perspective view of the base portion 130 of the housing 110 of the mouse 100 according to various embodiments. FIG. 3B shows an enlarged view of a front portion of the base portion 130 of the housing 110 of the mouse 100 according to various embodiments. FIG. 3C shows another enlarged view of the front portion of the base portion 130 of the housing 110 of the mouse 100 according to various embodiments.

As shown in FIG. 3A and FIG. 3B, the scroll wheel 140 of the mouse 100 may include an arresting surface 142 which extends circumferentially about the first axis 141. The scroll wheel 140 of the mouse 100 may include a ring portion 148. The arresting surface 142 may be or may be disposed at an inner surface (or inner cylindrical surface) of the ring portion 148 of the scroll wheel 140. Accordingly, the scroll wheel 140 of the mouse 100 may include the ring portion 148 and the arresting surface 142, wherein the arresting surface 142 extends along an inner circumference of the ring portion 148. The arresting surface 142 may be directed (or facing) towards a centre of the ring portion 148. Further, the ring portion 148 of the scroll wheel 140 may include an outer surface (or outer cylindrical surface 144). The outer surface may extend along an outer circumference of the ring portion 148 and may be directed (facing) outwards away from the centre of the ring portion 148. The outer cylindrical surface 144 of the scroll wheel 140 may be textured for gripping so as to facilitate rotating of the scroll wheel 140 by the user. According to various embodiments, a center of the ring portion 148 may coincide with the first axis 141.

As further shown in FIG. 3A to FIG. 3C, the mouse 100 may further include a lever 160 which may be provided with a first lever arm 163 and a second lever arm 165. The lever 160 may be mounted on the housing 110. According to various embodiments, the lever 160 may be mounted to a wheel cradle which may be mounted to a base portion 130 of the housing 110. According to various other embodiments, the lever 160 may be mounted to a wheel cradle which may be integrally molded with the base portion 130 of the housing 110 and which may form an integral part of the base portion 130 of the housing 110.

According to various embodiments, the lever 160 may be mounted on the housing 110 so as to be pivotable about a pivot axis 161 (FIG. 4C) which extends between the first lever arm 163 and the second lever arm 165. Accordingly, the lever 160 may be mounted to the housing 110 such that the pivot axis 161 of the lever 160 extends at least substantially perpendicular to the first lever arm 163 and the second lever arm 165 of the lever 160. Hence, the lever 160 may be pivotable about the pivot axis 161 with the first lever arm 163 on one side of the pivot axis 161 and the second lever arm 165 on the other side of the pivot axis 161. Further, the lever 160 may be mounted to the base portion 130 of the housing 110 in a manner so as to be housed within the cavity enclosed by the housing 110. The lever 160 may also be pivotably mounted to the base portion 130 of the housing 110 between the first lever arm 163 and the second lever arm 165. Accordingly, the lever 160 may be pivotable relative to the base portion 130 of the housing 110 about the pivot axis 161.

According to various embodiments, the pivot axis 161 of the lever 160, the first axis 141 (which is the rotational axis of the scroll wheel 140) and the second axis 151 (which is the rotational axis of the auxiliary wheel 150) may be at least substantially parallel to each other.

According to various embodiments, a first free end portion 164 of the first lever arm 163 of the lever 160 may be configured to engage the arresting surface 142 of the scroll wheel 140 with an engagement force to arrest a rotation of the scroll wheel 140 with a corresponding arresting force. Accordingly, the first free end portion 164 of the first lever arm 163 of the lever 160 may contact or interact with the scroll wheel 140 so as to slow down or retard or resist or suppress a rotation of the scroll wheel 140. Hence, the scroll wheel 140 may be in the resistive-wheeling mode when the first free end portion 164 of the first lever arm 163 of the lever 160 is engaged to the arresting surface 142 of the scroll wheel 140. On the other hand, in case the first free end portion 164 of the first lever arm 163 is in a non-engagement condition, in which it does not engage the arresting surface 142, the scroll wheel 140 is then in the free-wheeling mode. In other words, according to various embodiments, the lever 160 may be pivotable to move the first free end portion 164 of the first lever arm 163 to disengage from the arresting surface 142 of the scroll wheel 140 for the scroll wheel 140 to be in the free-wheeling mode and may be pivotable to move the first free end portion 164 of the first lever arm 163 to engage with the arresting surface 142 of the scroll wheel 140 for the scroll wheel 140 to be in the resistive-wheeling mode. According to various embodiments, the first free end portion 164 of the first lever arm 163 of the lever 160 may engage the scroll wheel 140 via a ratchet arrangement or a frictional contact.

As shown in FIG. 3C, the mouse 100 may further include a motion converter 170 (or a rotary to linear motion converter). The motion converter 170 may include a rotary member which may be rotatable about a rotary input axis or rotational axis 171. According to various embodiments, the motion converter 170 may further include a linear output axis 173. According to various embodiments, the motion converter 170 may be connected to the auxiliary wheel 150. The auxiliary wheel 150 may provide the input motion (e.g. the rotary input motion) to the motion converter 170. The motion converter 170 may be disposed within the cavity enclosed by the housing 110. According to various embodiments, the rotary input axis or rotational axis 171 of the motion converter 170 (or the rotary input axis or rotational axis 171 of the rotary member of the motion converter 170) and the pivot axis 161 of the lever 160 may be substantially parallel to each other. According to various embodiments, the motion converter 170 may be configured to convert a rotary input motion provided by the auxiliary wheel 150 about the rotary input axis or rotational axis 171 (or the rotational movement of the rotary member of the motion converter 170 about the rotary input axis or rotational axis 171) into an output motion (e.g. linear output motion along the linear output axis 172). The motion converter 170 may include an elongated member 172. Accordingly, rotating the auxiliary wheel 150 may cause the motion converter 170 to convert the rotary input motion (or the rotational movement of the rotary member of the motion converter 170) into the output motion (e.g. the linear output motion) so as to generate a linear motion of the elongated member 172 of the motion converter 170).

According to various embodiments, the motion converter 170 may include a rack and pinion mechanism, or a nut and screw mechanism, or a crank and slider mechanism, or any other suitable mechanism. Accordingly, the rotary member of the motion converter 170 may be the pinion (i.e. of the rack and pinion mechanism), or the nut or the screw (i.e. of the nut and screw mechanism), or the crank (i.e. of the crank and slider mechanism), or any other rotary member of any other suitable mechanism.

According to various embodiments, the motion converter 170 may also be connected to or in engagement with a second free end portion 166 of the second lever arm 165 of the lever 160. Accordingly, the elongated member 172 of the motion converter 170 may be connected to or in engagement with the second free end portion 166 of the second lever arm 165 of the lever 160. Hence, the motion converter 170 may apply an output force (e.g. a linear force) at the second free end portion 166 of the second lever arm 165 of the lever 160, via the output motion of the motion converter 170 (e.g. the linear motion of the elongated member 172 of the motion converter 170). In other words, the output motion of the motion converter 170 may move the second free end portion 166 of the second lever arm 165 of the lever 160. For example, the linear output motion (i.e. output motion) of the motion converter 170 may move the elongated member 172 linearly for moving the second free end portion 166 of the second lever arm 165 of the lever 160.

According to various embodiments, the motion converter 170 may be configured to apply said output motion (e.g. linear output motion) to the second free end portion 166 of the second lever arm 165 so as to pivot the lever 160 about the pivot axis 161 to correspondingly adjust the engagement force exerted by the first free end portion 164 of the first lever arm 163 of the lever 160 on the arresting surface 142 of the scroll wheel 140, whereby the corresponding arresting force applied to the scroll wheel 140 may be correspondingly adjustable by the rotation of the auxiliary wheel 150 and/or the rotary member (e.g. pinion, nut, screw, crank, or any other suitable rotary member) of the motion converter 170. Accordingly, the output motion (e.g. linear output motion) applied on the second free end portion 166 of the second lever arm 165 of the lever 160 may generate or produce a moment to pivot the lever 160 about the pivot axis 161 such that the engagement force exerted by the first free end portion 164 of the first lever arm 163 of the lever 160 on the arresting surface 142 of the scroll wheel 140 may be varied over a range depending on a degree of the output motion (e.g. linear output motion) applied.

According to various embodiments, the output motion (e.g. linear output motion) applied on the second free end portion 166 of the second lever arm 165 of the lever 160 may pivot the lever 160 about the pivot axis 161 such that the first free end portion 164 of the first lever arm 163 of the lever 160 may be fully disengaged from the arresting surface 142 of the scroll wheel 140, whereby no engagement force is exerted by the first free end portion 164 of the first lever arm 163 of the lever 160 on the arresting surface 142 of the scroll wheel 140.

Accordingly, the scroll wheel 140 may be in the free-wheeling mode when the first free end portion 164 of the first lever arm 163 of the lever 160 is fully disengaged from the arresting surface 142 of the scroll wheel 140. On the other hand, the scroll wheel 140 may be in the adjustable resistive-wheeling mode whenever the first free end portion 164 of the first lever arm 163 of the lever 160 is exerting an engagement force, which may be adjusted or varied, on the arresting surface 142 of the scroll wheel 140. Thus, according to various embodiments, the scroll wheel 140 may be adjusted between different modes of scrolling by controlling the degree of output motion (e.g. linear output motion) applied at the second free end portion 166 of the second lever arm 165 of the lever 160 via controlled rotation of the auxiliary wheel 150 and/or the rotary member of the motion converter 170. The rolling resistance/arresting force of the scroll wheel 140 may also be adjusted, for example increased or decreased, by controlling the degree of output motion (e.g. linear output motion) applied at the second free end portion 166 of the second lever arm 165 of the lever 160 via controlled rotation of the auxiliary wheel 150 and/or the rotary member of the motion converter 170.

Thus, the motion converter 170 may be configured to convert the rotary input motion or the rotational movement of the rotary member about the rotary input axis or rotational axis 171 into the output motion (e.g. linear output motion along the linear output axis 173) for moving the second free end portion 166 of the second lever arm 165 so as to pivot the lever 160 about the pivot axis 161 for engaging or disengaging the first free end portion 164 of the first lever arm 163 and the arresting surface 142 of the scroll wheel 140 to interchange the scroll wheel 140 between the free-wheeling mode and the resistive-wheeling mode. In other words, the motion converter 170 may be configured to convert the rotational movement (e.g. of the auxiliary wheel 150 and/or the rotary member of the motion converter 170) about the rotary input axis or rotational axis 171 into the output motion to move the second free end portion 166 of the second lever arm 165 so as to pivot the lever 160 about the pivot axis 161 for engaging or disengaging the first free end portion 164 of the first lever arm 163 and the arresting surface 142 of the scroll wheel 140

FIG. 4A to FIG. 4D show various views of an assembly 101 of the scroll wheel 140 and the auxiliary wheel 150 of the mouse 100 according to various embodiments.

Figure 4A:
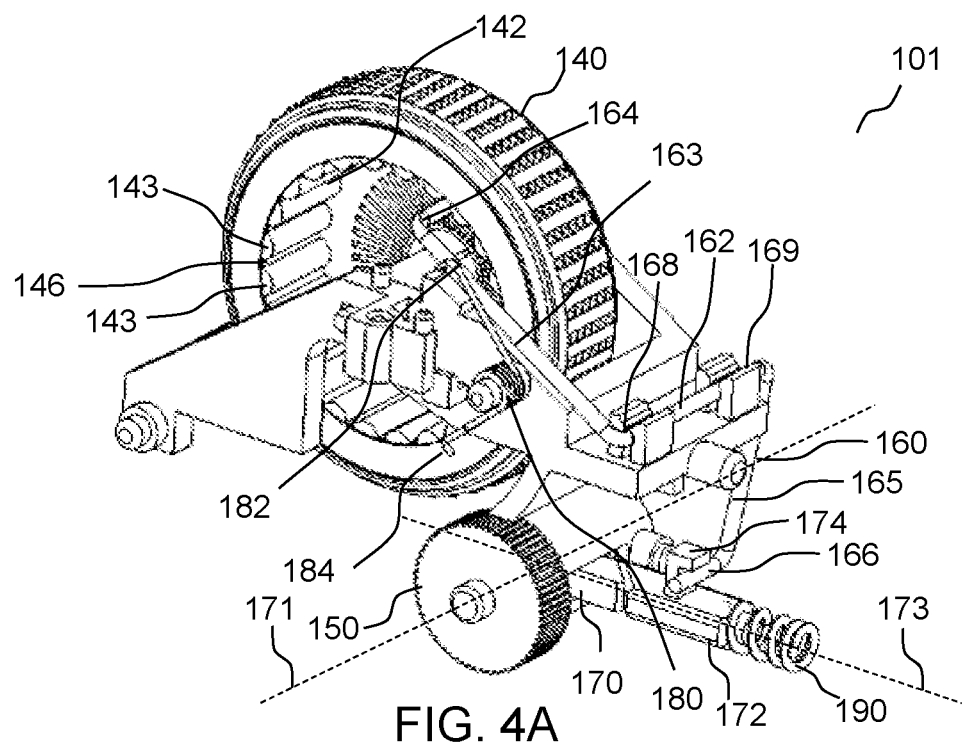
FIG. 4A to FIG. 4D show various views of an assembly of a scroll wheel and an auxiliary wheel of the mouse of FIG. 2A according to various embodiments.
Figure 4B:
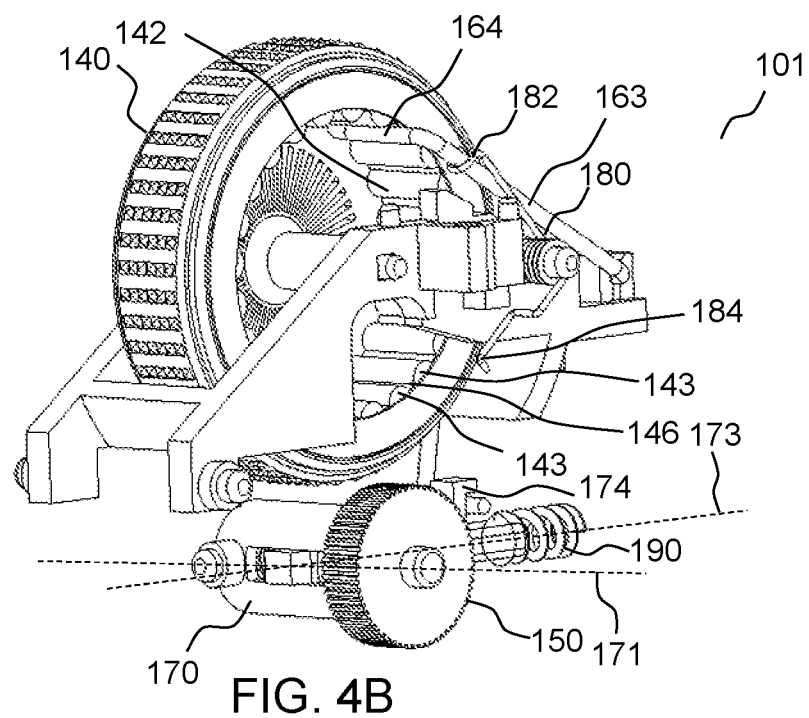
Figure 4C:
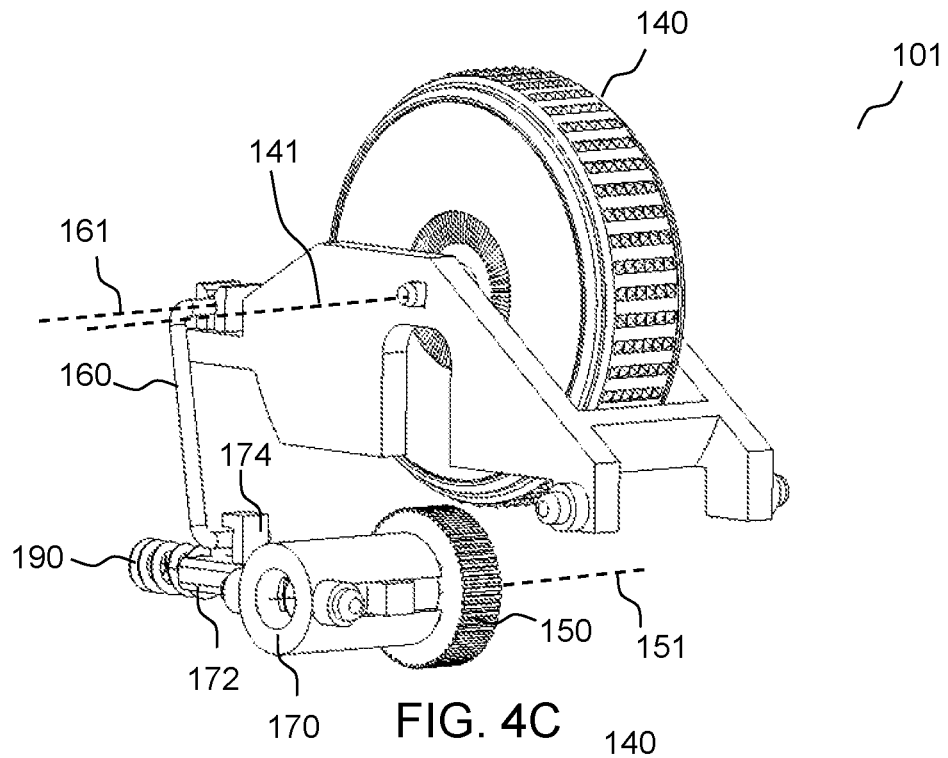
Figure 5A:
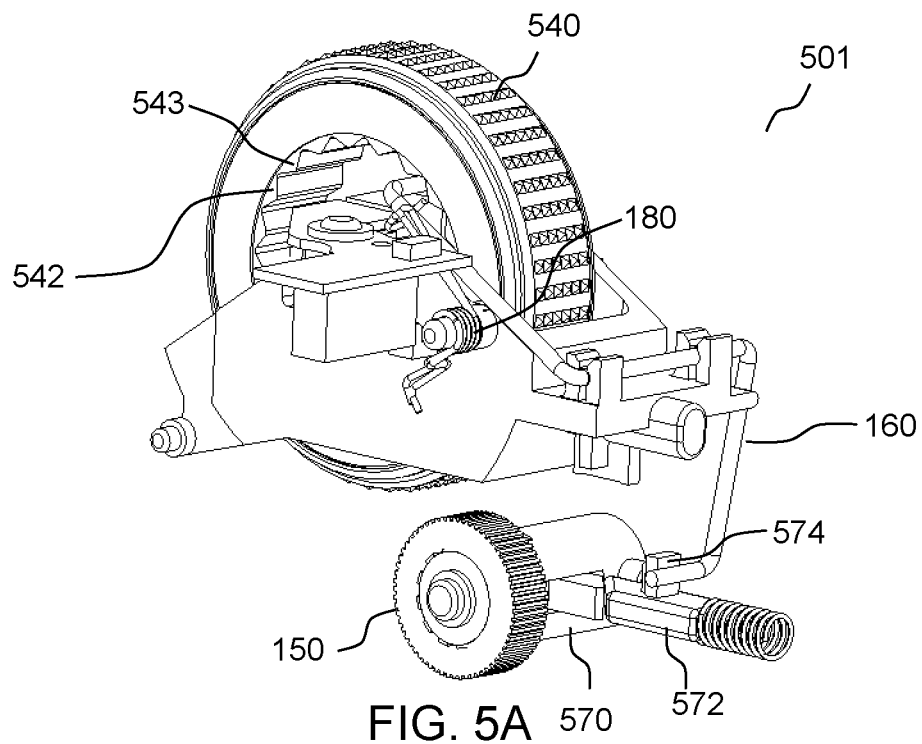
FIG. 5A and FIG. 5B show various views of an assembly of a scroll wheel and an auxiliary wheel of a mouse according to various embodiments.
Figure 5B:
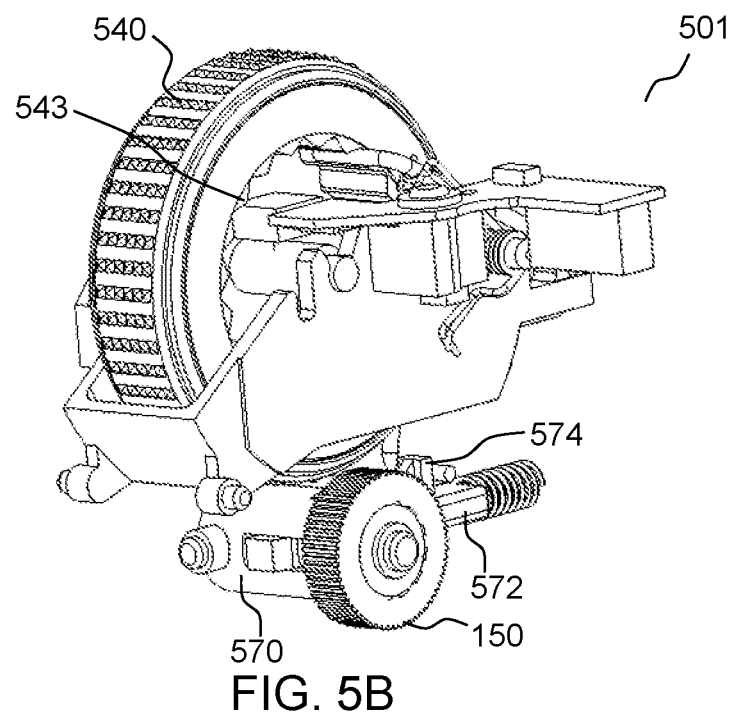

As shown in FIG. 4A and FIG. 4B, the arresting surface 142 of the scroll wheel 140 may include a plurality of serrations 143. As shown, the plurality of serrations 143 may be rounded or curved. According to various embodiments, the plurality of serrations 143 may be pointed or V-shaped or tapered, for example as shown in FIG. 5A and FIG. 5B. Referring back to FIG. 4A and FIG. 4B, in between each adjacent pair of serrations may be a notch 146. Further, the first free end portion 164 of the first lever arm 163 of the lever 160 may include a finger or a rod-shaped extension. According to various embodiments, the finger may be configured to fit into a respective notch 146 between respective two adjacent serrations of the plurality of serrations 143 of the arresting surface 142 of the scroll wheel 140. Accordingly, the first free end portion 164 of the first lever arm 163 of the lever 160 may engage the scroll wheel 140 via interlocking the finger of the first free end portion 164 of the first lever arm 163 of the lever 160 with the notch 146 of the arresting surface 142 of the scroll wheel 140.

Figure 4D:
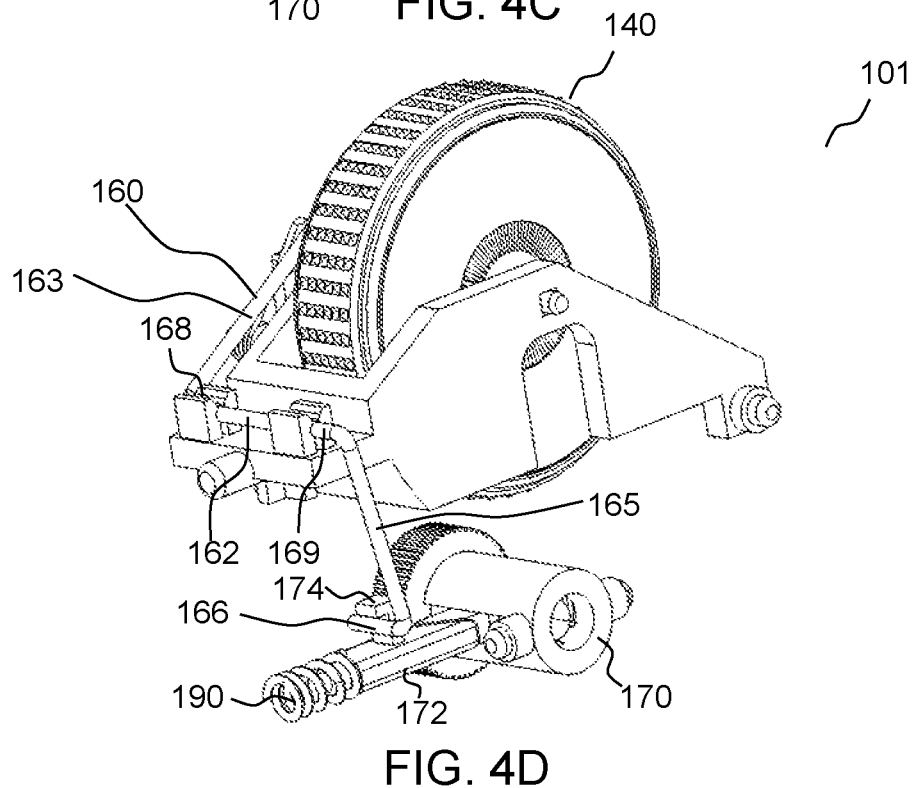

As shown in FIG. 4A and FIG. 4D, the lever 160 may include an elongated connection section 162 which may form a pivot axle defining the pivot axis 161 of the lever 160. The first lever arm 163 and the second lever arm 165 may be fixedly connected to each other via the elongated connection section 162. Further, the pivot axle formed by the elongated connection section 162 may extend at least substantially perpendicular to a respective longitudinal extension direction of both the first lever arm 163 and the second lever arm 165. Furthermore, the elongated connection section 162 may include a first section end 168 and a second section end 169. The first section end 168 may be connected to a first connection end, opposite to the first free end portion 164, of the first lever arm 163. The second section end 169 may be connected to a second connection end, opposite to the second free end portion 166, of the second lever arm 165.

Referring to FIG. 4A and FIG. 4B, the mouse 100 may further include a biasing mechanism 180. The biasing mechanism 180 may be connected to the first lever arm 163 of the lever 160 to apply a biasing force on the first free end portion 164 of the first lever arm 163 so as to bias the first free end portion 164 of the first lever arm 163 towards the arresting surface 142 of the scroll wheel 140 to exert the engagement force by the first free end portion 164 of the first lever arm 163 on the arresting surface 142 of the scroll wheel 140. Accordingly, the biasing mechanism 180 may bias the first free end portion 164 of the first lever arm 163 of the lever 160 against the arresting surface 142 of the scroll wheel 140 to exert the engagement force on the arresting surface 142 of the scroll wheel 140 so as to arrest a rotation of the scroll wheel 140. Accordingly, a first end 182 of the biasing mechanism 180 may be connected to the first lever arm 163 of the lever 160 and a second end 184 of the biasing mechanism 180 may be fixed to the base portion 130 of the housing 110. According to various embodiments, the first end 182 of the biasing mechanism 180 may bias the first lever arm 163 of the lever 160 away from the second end 184 of the biasing mechanism 180 to push the first free end portion 164 of the first lever arm 163 of the lever 160 against the arresting surface 142 of the scroll wheel 140 so as to exert the engagement force on the arresting surface 142 of the scroll wheel 140. According to various embodiments, the biasing mechanism 180 may include a torsion spring.

According to various embodiments, the motion converter 170 may be configured to apply the output motion (e.g. linear output motion) to the second free end portion 166 of the second lever arm 165 of the lever 160 to pivot the lever 160 about the pivot axis 161 so as to correspondingly counter the biasing force exerted by the biasing mechanism 180 on the first free end portion 164 of the first lever arm 163 of the lever 160 to correspondingly adjust the engagement force exerted by the first free end portion 164 of the first lever arm 163 of the lever 160 on the arresting surface 142 of the scroll wheel 140 so as to arrest a rotation of the scroll wheel 140. Accordingly, the rolling resistance/arresting force of the scroll wheel 140 due to the biasing force of the biasing mechanism 180 may be adjusted in a controlled manner by controlling the degree of output motion (e.g. linear output motion) applied to the second free end portion 166 of second lever arm 165 of the lever 160 via controlled rotation of the auxiliary wheel 150 and/or the rotary member of the motion converter 170.

According to various embodiments, the output motion (e.g. linear output motion) applied on the second free end portion 166 of the second lever arm 165 of the lever 160 may pivot the lever 160 about the pivot axis 161 such that the first free end portion 164 of the first lever arm 163 of the lever 160 may be fully disengaged from the arresting surface 142 of the scroll wheel 140, whereby the biasing force of the biasing mechanism 180 may no longer cause the first free end portion 164 of the first lever arm 163 of the lever 160 to exert an engagement force on the arresting surface 142 of the scroll wheel 140. Hence, the motion converter 170 may move the second free end portion 166 of the second lever arm 165 of the lever 160 to pivot the lever 160 about the pivot axis 161 so as to correspondingly counter the biasing force exerted by the biasing mechanism 180 on the first free end portion 164 of the first lever arm 163 of the lever 160 for disengaging from the arresting surface 142 of the scroll wheel 140 to change the scroll wheel 140 into the free-wheeling mode. Accordingly, the rolling resistance of the scroll wheel 140 may be changed between the free-wheeling mode and the predetermined maximum resistive-wheeling mode by controlling the degree of output motion (e.g. linear output motion) applied to the second free end portion 166 of the second lever arm 165 of the lever 160 by the motion converter 170 via controlled rotation of the auxiliary wheel 150 and/or the rotary member of the motion converter 170.

According to various embodiments, the elongated member 172 of the motion converter 170 may be movable linearly along a longitudinal axis of the elongated member 172. The elongated member 172 may be connected to or in engagement with the second free end portion 166 of the second lever arm 165 of the lever 160 so as to apply the output motion (e.g. linear output motion) to the second free end portion 166 of the second lever arm 165 of the lever 160. Hence, the elongated member 172 may move the second free end portion 166 of the second lever arm 165 of the lever 160. Accordingly, the motion converter 170 may convert a rotation of the auxiliary wheel 150 and/or the rotary member of the motion converter 170, which is provided to the motion converter 170 as the rotary input motion, into the output motion (e.g. linear output motion) to move the elongated member 172 linearly in a longitudinal direction for moving the second free end portion 166 of the second lever arm 165 of the lever 160.

According to various embodiments, the elongated member 172 may include a projection 174 configured to engage or catch or contact or interlock or receive the second free end portion 166 of the lever 160 such that the movement (e.g. linear motion) of the elongated member 172 may be transferred or applied or transmitted or passed on to the second free end portion 166 of the lever 160 for pivoting the lever 160 about the pivot axis 161. As shown in FIG. 4A to FIG. 4D, the projection 174 may be in the form of a hook or an angled structure. According to various embodiments, the projection 174 may also be in the form of a flat wall or a bar or a rod, which may be at least substantially perpendicular to the elongated member 172, as shown in FIG. 5A or FIG. 5B. Accordingly, the projection 174 may be protruding from the elongated member 172 in a protrusion direction perpendicular to the longitudinal axis of the elongated member 172.

According to various embodiments, when the motion converter 170 includes a nut and screw shaft mechanism, the motion converter 170 may be a nut and screw shaft motion converter. Accordingly, the elongated member 172 of the motion converter 170 may be connected to or in contact with the screw shaft, and the nut (i.e. rotary member) of the motion converter 170 may be connected to or in engagement with the auxiliary wheel 150. Hence, when the motion converter 170 includes a nut and screw shaft mechanism, the motion converter 170 may be a one-way or a single-way mechanism whereby rotating the auxiliary wheel 150 to provide the rotary input motion may rotate the nut (i.e. rotary member) (or set the nut into the rotational movement) which may be converted into the output motion to move the second free end portion 166 of the second lever arm 165. According to various embodiments, the rotational movement of the nut (i.e. rotary member) may be converted to the output motion (e.g. linear output motion) to move the screw shaft linearly so as to convert a rotation of the rotary member of the motion converter 170 into the output motion (e.g. linear motion) of the elongated member 172 to move the second free end portion 166 of the second lever arm 165. On the other hand, the motion converter 170 may not allow the elongated member 172 to be actuated linearly to cause a rotation of the auxiliary wheel 150 and/or the rotary member of the motion converter 170. Further, the nut and screw shaft mechanism may allow the elongated member 172 to be held in place whenever the rotation of the auxiliary wheel 150 and/or the rotary member of the motion converter 170 is stopped. Hence, the elongated member 172 may be moved linearly and may be stopped at any desired position.

According to various other embodiments, when the motion converter 170 includes a rack and pinion mechanism, the motion converter 170 may be a rack and pinion motion converter. Accordingly, the elongated member 172 of the motion converter 170 may be connected to or in contact with the rack of the motion converter 170, and the pinion (i.e. rotary member) of the motion converter 170 of the motion converter 170 may be connected to or in engagement with the auxiliary wheel 150. Hence, rotating the auxiliary wheel 150 may cause a rotational movement of the pinion (i.e. rotary member) of the motion converter 170 which may be converted by the motion converter 170 into the output motion. Particularly, rotating the auxiliary wheel 150 may impart the rotary input motion to rotate the pinion (i.e. rotary member) of the motion converter 170 (or set the pinion into the rotational movement) which may be converted to the output motion (e.g. linear output motion) of the rack of the motion converter 170 for moving the elongated member 172. According to various other embodiments, when the motion converter 170 includes a crank and slider mechanism, the motion converter 170 may be a crank and slider motion converter. Accordingly, the elongated member 172 of the motion converter 170 may be connected to or in contact with the slider, and the crank (i.e. rotary member) of the motion converter 170 may be connected to or in engagement with the auxiliary wheel 150. Hence, rotating the auxiliary wheel 150 may cause a rotational movement of the crank (i.e. rotary member) of the motion converter 170 which may be converted by the motion converter 170 into the output motion. Particularly, rotating the auxiliary wheel 150 may impart the rotary input motion to rotate the crank (i.e. rotary member) of the motion converter 170 (or set the crank into the rotational movement) which may be converted to the output motion (e.g. linear output motion) of the slider of the motion converter 170 for moving the elongated member 172.

Referring to FIG. 4A to FIG. 4D, the mouse 100 may further include an auxiliary biasing mechanism 190. The auxiliary biasing mechanism 190 may be connected to the elongated member 172 of the motion converter 170. Accordingly, a first end of the auxiliary biasing mechanism 190 may be connected to the elongated member 172 of the motion converter 170 and a second end of the auxiliary biasing mechanism 190 may be fixed to a holder 133 (see FIG. 3C) on the base portion 130 of the housing 110. According to various embodiments, the auxiliary biasing mechanism 190 may include a coil spring. Further, according to various embodiments, the auxiliary biasing mechanism 190 may be configured to keep or bias the elongated member 172 to be in firm contact or connection with the mechanism of the motion converter 170, regardless of the position of the elongated member 172, such that the elongated member 172 may be sensitive or responsive to a rotation of the auxiliary wheel 150 and/or the rotary member of the motion converter 170 so as to readily or immediately move the elongated member 172 linearly as a result of the rotation of the auxiliary wheel 150 and/or the rotary member of the motion converter 170 to cause the lever 160 to pivot for adjusting the arresting force on the scroll wheel 140.

FIG. 5A and FIG. 5B show various views of an assembly 501 of a scroll wheel 540 and an auxiliary wheel 150 of a mouse according to various embodiments. The assembly 501 of FIG. 5A and FIG. 5B may differ from the assembly 101 of FIG. 4A to FIG. 4D in that the plurality of serrations 543 of the arresting surface 542 of the scroll wheel 540 of the assembly 501 may be sharp and pointed, whereas the plurality of serrations 143 of the arresting surface 142 of the scroll wheel 140 of assembly 101 may be rounded and curved. Further, the assembly 501 of FIG. 5A and FIG. 5B may also differ from the assembly 101 of FIG. 4A to FIG. 4D in that the projection 574 of the elongated member 572 of the motion converter 570 of the assembly 501 may be a hook or angled structure, whereas the projection 174 of the elongated member 172 of the motion converter 170 of the assembly 101 may be a vertical flat wall or a vertical bar. The other components of the assembly 501, such as the lever 160, the auxiliary wheel 150, and the biasing mechanism 180, may be similar to those of the assembly 101.

According to various embodiments, the mouse 100 may include an electric motor coupled to the auxiliary wheel 150. Accordingly, the auxiliary wheel 150 may be rotated by the electric motor. Hence, in addition to being manually rotatable by the user via the user's finger stroking the auxiliary wheel 150 to provide the rotary input motion to the motion converter 170, 570 (or to set the rotary member of the motion converter 170, 570 into the rotational movement) for conversion into the output motion (e.g. linear output motion) to move the second free end portion 166 of the second lever arm 165 so as to pivot the lever 160 about the pivot axis 161 for engaging or disengaging the first free end portion 164 of the first lever arm 163 and the arresting surface 142 of the scroll wheel 140 to interchange the scroll wheel 140 between the free-wheeling mode and the resistive-wheeling mode, the auxiliary wheel 150 may also be rotated via the electric motor to provide the rotary input motion (or to set the rotary member of the motion converter 170, 570 into the rotational movement). Thus, the user may activate the electric motor to switch the scroll wheel 140 between the free-wheeling mode and the resistive-wheeling mode, either by a software application (e.g. via an external processor-based device) or by a switch on the mouse.

FIG. 6A to FIG. 6D show various views of another assembly 601 of the scroll wheel 140 and a motion converter 670 for the mouse 100 according to various embodiments. According to various embodiments, instead of the auxiliary wheel 150, an electric motor 653 may be coupled to the motion converter 670 to provide the rotary input motion about the rotary input axis or rotational axis 671 (or set a rotary member (e.g. pinion 696) of the motion converter into a rotational movement about the rotary input axis or rotational axis 671) for converting into the output motion (e.g. the linear output motion along the linear output axis 673) to move the second free end portion 166 of the second lever arm 165 so as to pivot the lever 160 about the pivot axis 161 for engaging or disengaging the first free end portion 164 of the first lever arm 163 and the arresting surface 142 of the scroll wheel 140. Accordingly, the mouse 100 may include the electric motor 653. Hence, in this configuration without the auxiliary wheel 150, the user may switch the scroll wheel 140 between the free-wheeling mode and the resistive-wheeling mode, either by a software application (e.g. via an processor-based device) or by a switch on the mouse 100.

According to various embodiments, the electric motor 653 may be disposed within the cavity enclosed by the housing 110. According to various embodiments, as shown in FIG. 6A to FIG. 6D, the scroll wheel 140 may be mounted on a scroll-wheel-bracket 645 which may, in turn, be mounted to the base portion 130 of the housing 110 in a manner such that the portion of the scroll wheel 140 may be partly exposed through the cover surface 124 of the cover portion 120 of the housing 110 of the mouse 100 while the remaining portion of the scroll wheel 140 and the scroll-wheel-bracket 645 may be housed within the cavity enclosed by the housing 110.

According to various embodiments, the lever 160 may be integrated into or mounted to the scroll-wheel-bracket 645. Accordingly, the lever 160 may also be mounted to the base portion 130 of the housing 110, via the scroll-wheel-bracket 645, between the first lever arm 163 and the second lever arm 165. The lever 160 may be pivotably mounted to the scroll-wheel-bracket 645. Accordingly, the lever 160 may be pivotable relative to the base portion 130 of the housing 110, as well as the scroll-wheel-bracket 645, about the pivot axis 161.

According to various embodiments, the motion converter 670 may be integrated into or mounted to the scroll-wheel-bracket 645, which is mounted to the base portion 130 of the housing 110. According to various embodiments, the motion converter 670 and the lever 160 may be disposed or arranged such that the rotary input axis or rotational axis 671 of the motion converter 670 (e.g. of the pinion 696 of the motion converter 670) and the pivot axis 161 of the lever 160 may be substantially parallel to each other.

According to various embodiments, the electric motor 653 may be disposed or mounted to the scroll-wheel-bracket 645, which is mounted to the base portion 130 of the housing 110. According to various embodiments, the electric motor 653 may be coupled to the motion converter 670. According to various embodiments, the electric motor 653, the motion converter 670, and the lever 160 may be disposed or arranged such that the rotary input axis or rotational axis 671 of the motion converter 670 (e.g. of the pinion 696 of the motion converter 670), a rotational driving axis 655 of the electric motor 653, and the pivot axis 161 of the lever 160 may be substantially parallel to each other. According to various embodiments, the motion converter 670 may convert the rotary input motion about the rotary input axis or rotational axis 671, which is transmitted from the electric motor 653, or the rotational movement of the pinion 696 of the motion converter 670, into the output motion (e.g. the linear output motion along the linear output axis 672). Accordingly, activating the electric motor 653 may cause the motion converter 670 to convert the rotary input motion or the rotational movement of the rotary member of the motion converter 670 into the output motion (e.g. the linear output motion) so as to generate the movement (e.g. linear motion) of the elongated member 672 of the motion converter 670). According to various embodiments, the motion converter 670 may include a rack and pinion mechanism, or a nut and screw mechanism, or a crank and slider mechanism, or any other suitable mechanism. Accordingly, according to various embodiments, the rotary member of the motion converter may be the pinion, or the nut, or the screw, or the crank, or any other suitable component. Further, according to various embodiments, the elongate member 672 may be the rack, the screw, the slider, or any other suitable component.

According to various embodiments, the motion converter 670 may be in engagement with the second free end portion 166 of the second lever arm 165 of the lever 160. Accordingly, the elongated member 672 of the motion converter 670 may be in engagement with the second free end portion 166 of the second lever arm 165 of the lever 160. Hence, the motion converter 670 may move the second free end portion 166 of the second lever arm 165 of the lever 160 via the output motion (e.g. linear motion) of the elongated member 672 of the motion converter 670. In other words, the output motion (e.g. linear output motion) of the motion converter 670 may move the elongated member 672 linearly for moving the second free end portion 166 of the second lever arm 165 of the lever 160.

According to various embodiments, the motion converter 670 may move the second free end portion 166 of the second lever arm 165 so as to pivot the lever 160 about the pivot axis 161 to correspondingly move the first free end portion 164 of the first lever arm 163 of the lever 160 for engaging or disengaging the arresting surface 142 of the scroll wheel 140. Accordingly, the scroll wheel 140 may be in the free-wheeling mode when the first free end portion 164 of the first lever arm 163 of the lever 160 is fully disengaged from the arresting surface 142 of the scroll wheel 140. On the other hand, the scroll wheel 140 may be in the resistive-wheeling mode whenever the first free end portion 164 of the first lever arm 163 of the lever 160 is engaged to the arresting surface 142 of the scroll wheel 140. Thus, according to various embodiments, the scroll wheel 140 may be switched between different modes of scrolling by controlling the motion converter 670 to move the second free end portion 166 of the second lever arm 165 of the lever 160 via controlled rotation of the electric motor 645.

Thus, the motion converter 670 may be configured to convert the rotary input motion about the rotary input axis or rotational axis 671 (or the rotational movement of the rotary member of the motion converter 670) into the output motion (e.g. linear output motion) along the linear output axis 673 for moving the second free end portion 166 of the second lever arm 165 so as to pivot the lever 160 about the pivot axis 161 for engaging or disengaging the first free end portion 164 of the first lever arm 163 and the arresting surface 142 of the scroll wheel 140 to interchange the scroll wheel 140 between the free-wheeling mode and the resistive-wheeling mode.

According to various embodiments, the elongated member 672 of the motion converter 670 may be movable linearly along the longitudinal axis of the elongated member 672. The elongated member 672 may be in engagement with the second free end portion 166 of the second lever arm 165 of the lever 160 so as to apply the output motion (e.g. linear output motion) to the second free end portion 166 of the second lever arm 165 of the lever 160. Hence, the elongated member 672 may move the second free end portion 166 of the second lever arm 165 of the lever 160. Accordingly, the motion converter 670 may convert the rotary input motion provided to the motion converter 670 from the electric motor 653 (or the rotational movement of the rotary member of the motion converter 670) into the output motion (e.g. linear output motion) to move the elongated member 672 linearly along the longitudinal axis of the elongated member 672 for moving the second free end portion 166 of the second lever arm 165 of the lever 160.

Figure 6A:
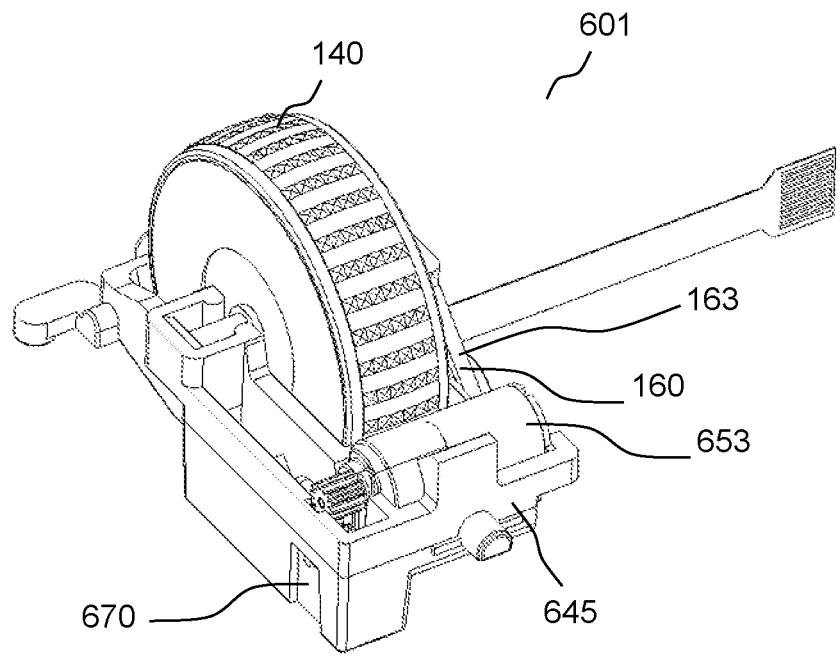
FIG. 6A to FIG. 6D show various views of another assembly of the scroll wheel and a motion converter for the mouse of FIG. 1A according to various embodiments.
Figure 6B:
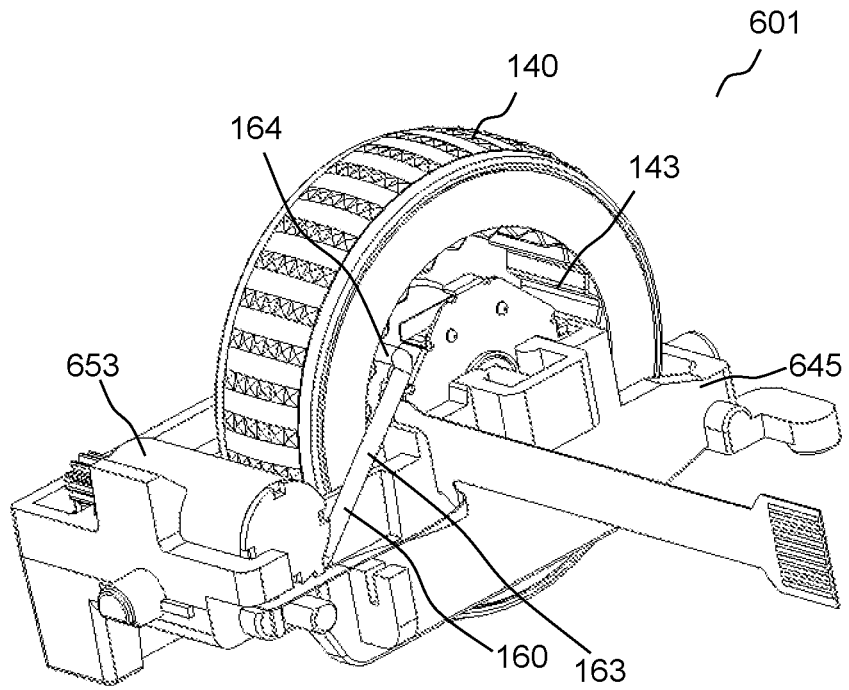
Figure 6C:
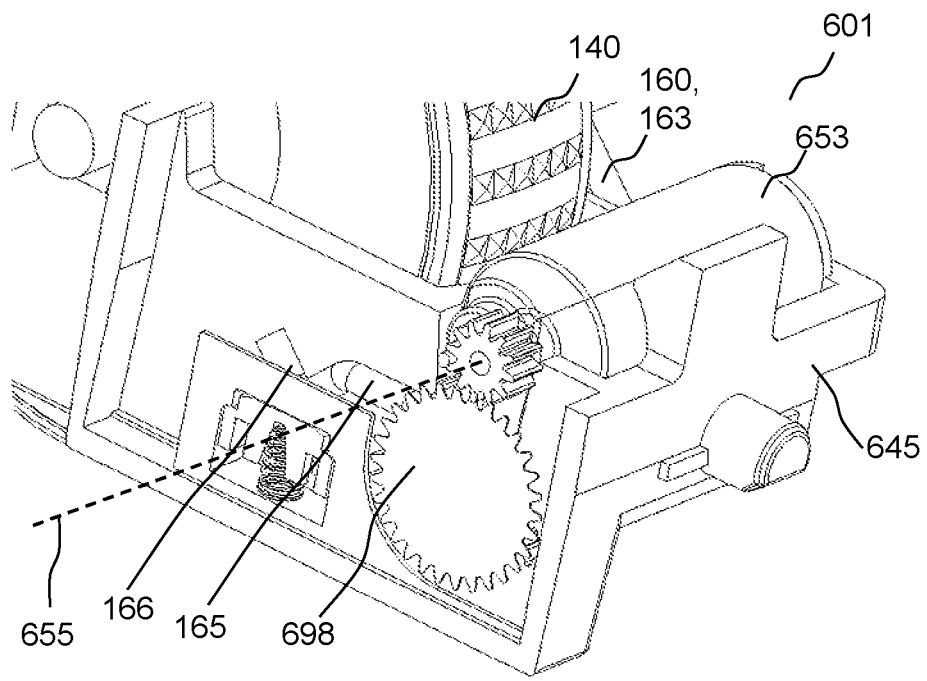
Figure 6D:
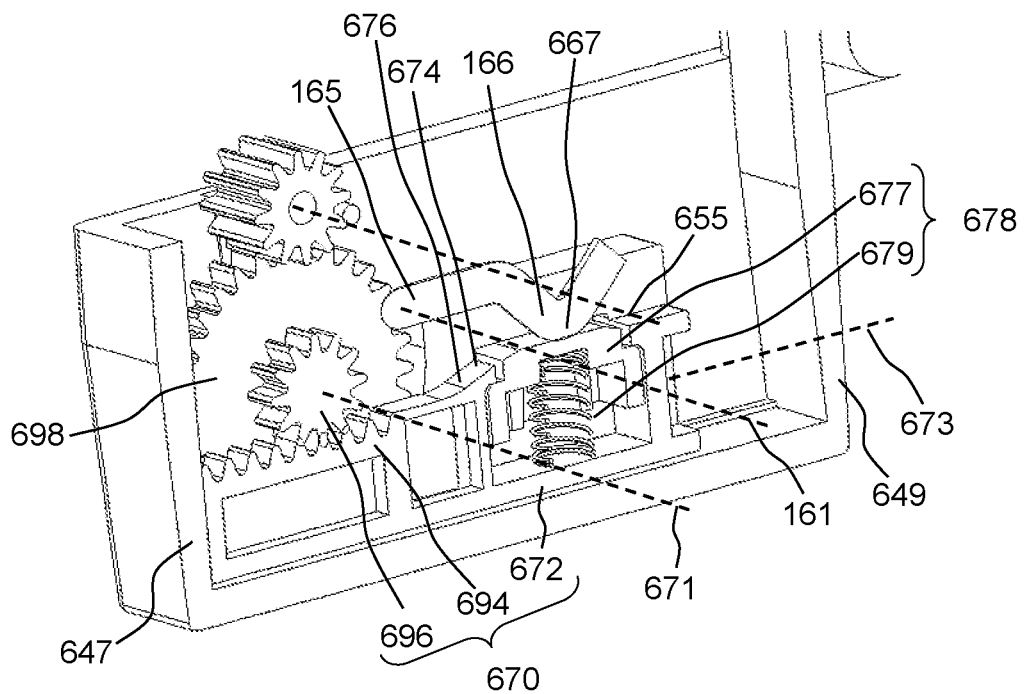

According to various embodiments, the elongated member 672 may include a projection 674 to engage or contact or abut or receive the second free end portion 166 of the second lever arm 165 of the lever 160 such that the movement (e.g. linear motion) of the elongated member 672 may be transferred or applied or transmitted or passed on to the second free end portion 166 of the lever 160 for pivoting the lever 160 about the pivot axis 161. FIG. 6C shows a partial cut out view of the scroll-wheel-bracket 645 to show part of the motion converter 670 according to various embodiments. FIG. 6D shows a cross-sectional view of the scroll-wheel-bracket 645 to show part of the motion converter 670 according to various embodiments. As shown in FIG. 6C and FIG. 6D, the projection 674 may be protruding from the elongated member 672 in a protrusion direction perpendicular to the longitudinal axis of the elongated member 672. According to various embodiments, the projection 674 may include an inclined surface 676. The inclined surface 676 may extend from a root of the projection 674 to a tip of the projection 674. According to various embodiments, the second free end portion 166 of the lever 160 may be engaged to a longitudinal side of the elongated member 672 from which the projection 674 protrudes. Accordingly, the second free end portion 166 of the lever 160 may be abutting the longitudinal side of the elongated member 672 such that moving the elongated member 672 linearly along the longitudinal axis of the elongated member 672 may cause the second free end portion 166 of the second lever arm 160 to slide along the inclined surface 676 of the projection 674 to move the second free end portion 166 of the second lever arm 160 along the protrusion direction perpendicular to the longitudinal axis of the elongated member 672 for pivoting the lever 160.

According to various embodiments, the elongated member 672 comprises a spring-loaded pusher 678 adjacent to the tip of the projection 676 and directed in the protrusion direction perpendicular to the longitudinal axis of the elongated member 672. Accordingly, the spring-loaded pusher 678 may be disposed or arranged radially with respect to the longitudinal axis of the elongated member 672. According to various embodiments, moving the elongated member 672 linearly along the longitudinal axis of the elongated member 672 may cause the second free end portion 166 of the second lever arm 165 of the lever 160 to slide on or off the spring-loaded pusher 678. Accordingly, when the second free end portion 166 of the second lever arm 165 of the lever 160 is on the spring-loaded pusher 678, the spring-loaded pusher 678 may provide a resilience cushioning effect whereby the second free end portion 166 of the second lever arm 165 of the lever 160 may compress the spring-loaded pusher 678 and the spring-loaded pusher 678 subsequently recoil or spring back or push back.

According to various embodiments, the spring-loaded pusher 678 may include a pusher member 677 movable in the protrusion direction perpendicular to the longitudinal axis of the elongated member 672 and a biasing element 679 arranged to bias the pusher member away from the longitudinal side of the elongated member 672 in the protrusion direction perpendicular to the longitudinal axis of the elongated member 672. According to various embodiments, the biasing element 679 may include, but not limited to, a spring, a coil spring, or a compression spring. According to various embodiments, when the biasing element 679 is unloaded, the pusher member 677 may flush with the tip of the projection 674 of the elongated member 672. According to various embodiments, the tip of the projection 674 of the elongated member 672 and the spring-loaded pusher 678 may be in a side-by-side arrangement in or along the longitudinal axis of the elongated member 672.

According to various embodiments, the second free end portion 166 of the second lever arm 165 may include a V-shaped cross-sectional profile 667. According to various embodiments, the V-shaped cross-sectional profile 667 may be a tapered or an angled or a pointed portion at the second free end portion 166 of the second lever arm 165. According to various embodiments, a bottom of the V-shaped cross-sectional profile 667 of the second free end portion 166 may be directed perpendicularly from the second lever arm 165. Accordingly, the bottom of the V-shaped cross-sectional profile 667 of the second free end portion 166 may be pointing radially outwards from the second lever arm 165. According to various embodiments, the second free end portion 166 of the second lever arm 165 may be engaged to the elongated member 672 of the motion converter 670 with the bottom of the V-shaped cross-sectional profile 667 of the second free end portion 166 abutting the longitudinal side of the elongated member 672 so as to slide along the longitudinal side of the elongated member 672. Accordingly, the V-shaped cross-sectional profile 667 of the second free end portion 166 of the second lever arm 165 may slide up or down the inclined surface 676 as well as slide on or off the pusher member 677.

Figure 7A:
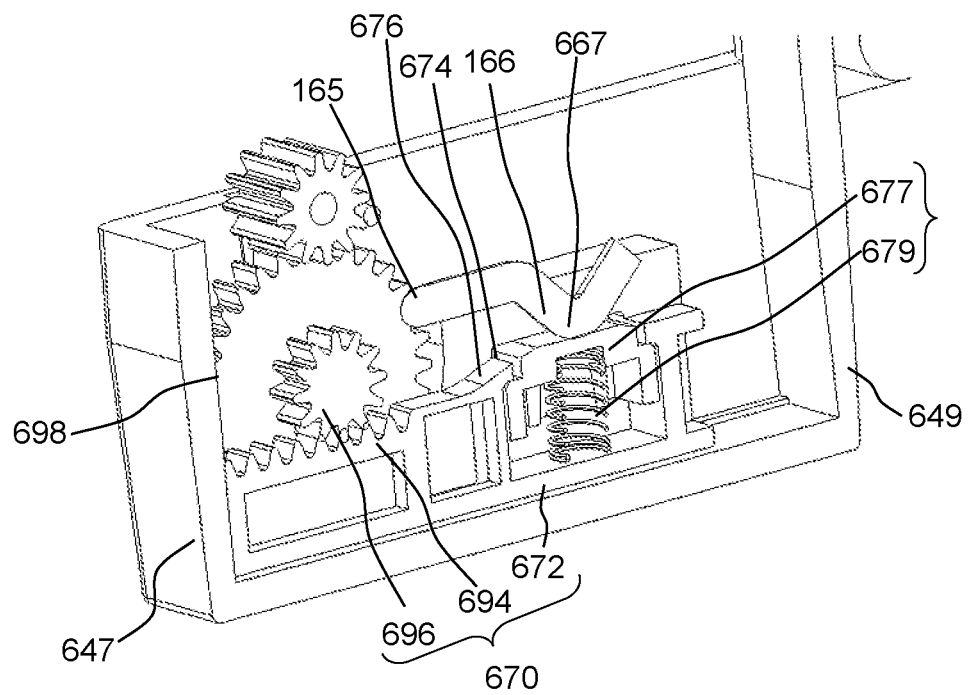
FIG. 7A and FIG. 7B show the assembly of FIG. 6A to FIG. 6D in the resistive-wheeling mode.
Figure 7B:
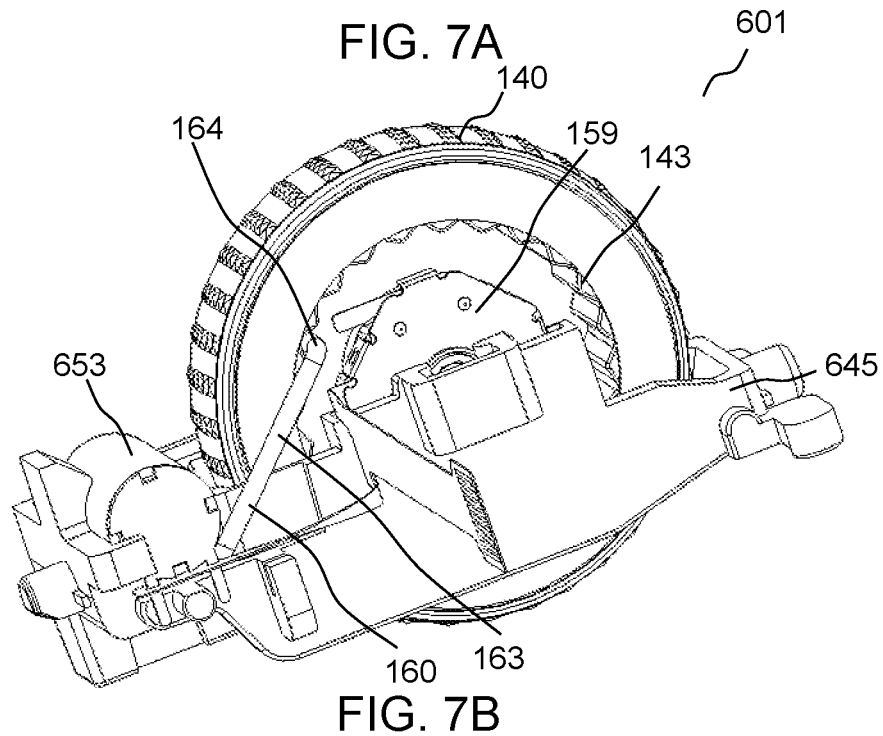

FIG. 7A shows the second free end portion 166 of the second lever arm 165 abutting the pusher member 677 of the elongated member 672 of the motion converter 670. FIG. 7B shows the first free end portion 164 of the first lever arm 163 in engagement with the arresting surface 142 of the scroll wheel 140. According to various embodiment, when the second free end portion 166 of the second lever arm 165 is moved by the elongated member 672 of the motion converter 670 such that the second free end portion 166 of the second lever arm 165 slide along the inclined surface 676 of the projection 674 onto the pusher member 677 of the elongated member 672 of the motion converter 670, the lever 160 may be pivoted such that the first free end portion 164 of the first lever arm 163 may be moved into engagement with the arresting surface 142 of the scroll wheel 140. According to various embodiments, with the second free end portion 166 of the second lever arm 165 abutting the pusher member 677 of the elongated member 672 of the motion converter 670, when the scroll wheel 140 is being rotated by the user, the first free end portion 164 of the first lever arm 163 may be moved along the profile of the plurality of serrations 143 of the scroll wheel 140 and the pusher member 677 may provide the resilient cushioning effect to allow the lever 160 to be pivoted accordingly as the first free end portion 164 of the first lever arm 163 moves along the profile of the plurality of serrations 143. Accordingly, the scroll wheel 140 may be in the resistive-wheeling mode when the second free end portion 166 of the second lever arm 165 is abutting the pusher member 677 of the elongated member 672 of the motion converter 670. According to various embodiments, an encoder 159 may be disposed inside the scroll wheel 140 to convert the rotational motion of the scroll wheel 140 during resistive-wheeling mode into output signal.

Figure 8A:
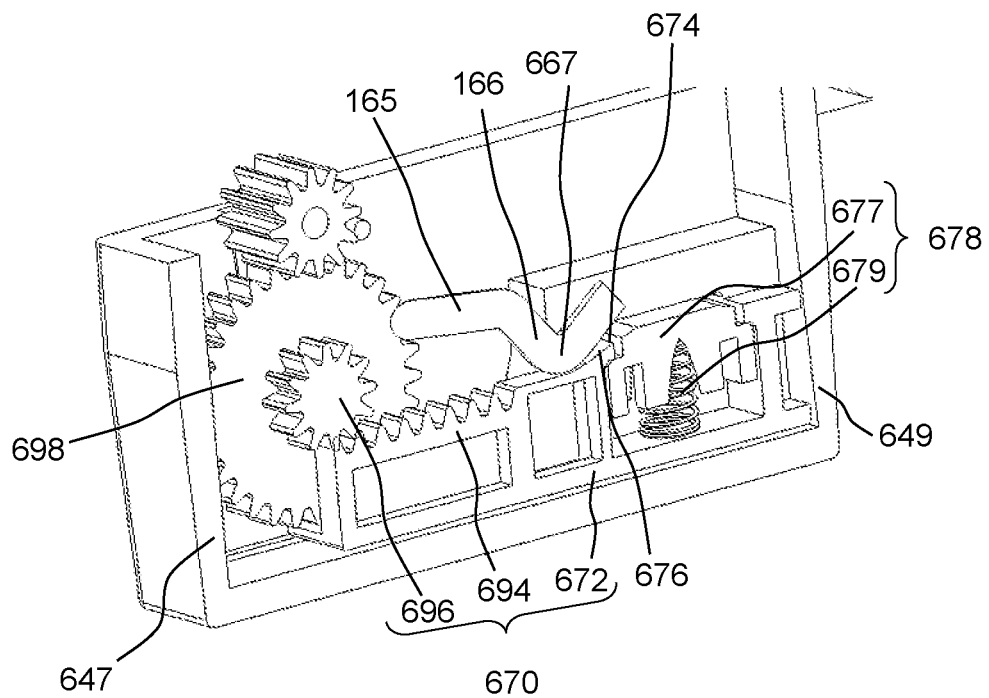
FIG. 8A and FIG. 8B show the assembly of FIG. 6A to FIG. 6D in the free-wheeling mode.

FIG. 8A shows the second free end portion 166 of the second lever arm 165 in a position in which it is slidden off the pusher member 677 of the elongated member 672 of the motion converter 670 and abutting the longitudinal side of the elongated member 672 of the motion converter 670. FIG. 7B shows the first free end portion 164 of the first lever arm 163 disengaged from the arresting surface 142 of the scroll wheel 140. According to various embodiment, when the second free end portion 166 of the second lever arm 165 is moved by the elongated member 672 of the motion converter 670 such that the second free end portion 166 of the second lever arm 165 slide off the pusher member 677 of the elongated member 672 of the motion converter 670 and slide down the inclined surface 676 of the projection 674 of the elongated member 672, the lever 160 may be pivoted such that the first free end portion 164 of the first lever arm 163 may be moved away from the arresting surface 142 of the scroll wheel 140 so as to be disengaged from the arresting surface 142. Accordingly, the scroll wheel 140 may be in the free-wheeling mode when the second free end portion 166 of the second lever arm 165 is slidden off the pusher member 677 of the elongated member 672 of the motion converter 670. According to various embodiments, the encoder 159 disposed inside the scroll wheel 140 may convert the rotational motion of the scroll wheel 140 during free-wheeling mode into output signal.

Referring back to FIG. 6A to FIG. 6D, according to various embodiments, the motion converter 670 may include a rack and pinion mechanism. Accordingly, the motion converter 670 may be a rack and pinion motion converter. Accordingly, the elongated member 672 of the motion converter 670 may be connected to or in contact with a rack 694 of the motion converter 670, and the pinion 696 (i.e. rotary member) of the motion converter 670 may be driven by the electric motor 653. Hence, activating the electric motor 653 may impart the rotary input motion to the pinion 696 (i.e. rotary member) for rotating the pinion 696 about the rotary input axis or rotational axis 671 which may be converted to the linear output motion (i.e. output motion) of the rack 694 of the motion converter 670 for moving the elongated member 672. According to various embodiments, the elongated member 672 may be longitudinal aligned to the rack 694 of the motion converter 670. Accordingly, the elongated member 672 and the rack 694 may form a straight line. According to various embodiments, the elongated member 672 and the rack 694 may be integral so as to move as a single unit or a single piece. Accordingly, the elongated member 672 and the rack 694 may be molded integrally, or formed integrally, or integrally joined, or integrally coupled, or integrally connected together so as to form the single unit or single piece.

Figure 8B:
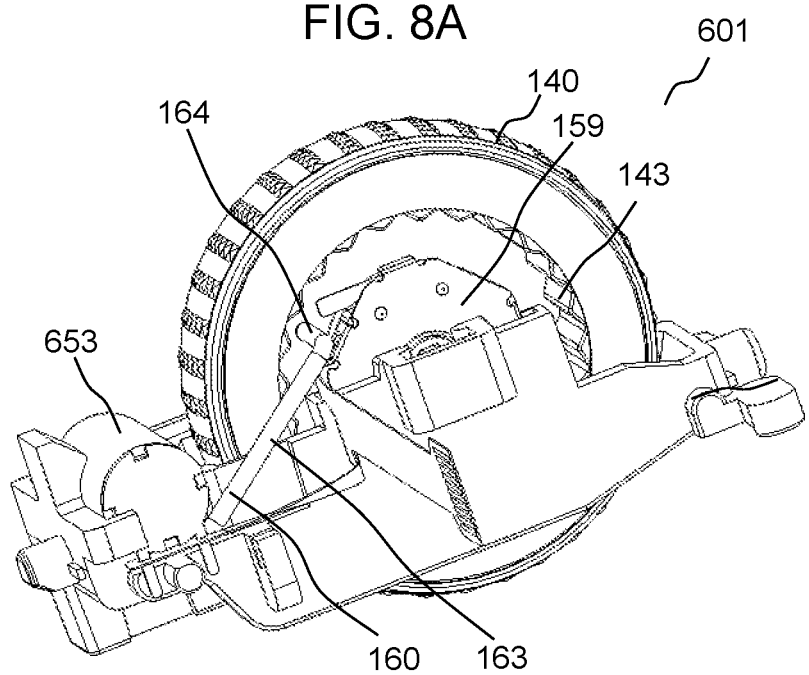

According to various embodiments, the scroll-wheel-bracket 645 may include a pair of stopper structures 647, 649, i.e. a first stopper structure 647 and a second stopper structure 649. The pair stopper structure 647, 649 may be along the longitudinal axis of the elongated member 672 of the motion converter 670 and may be spaced apart from each other such that the elongated member 672 of the motion converter 670 may be between the pair of stopper structures 647, 649. According to various embodiments, the elongated member 672 and the rack 694 may be between the pair of stopper structure 647, 649 such that pair of stopper structures 647, 649 may limit the linear movement of the elongated member 672 and the rack 694 in the longitudinal direction. According to various embodiments, when the rack 694 is abutting the first stopper structure 647, the second free end portion 166 of the second lever arm 165 may be abutting the pusher member 677 of the elongated member 672 of the motion converter 670 as shown in FIG. 7B. According to various embodiments, when the elongated member 672 is abutting the second stopper structure 649, the second free end portion 166 of the second lever arm 165 may be slidden off the pusher member 677 of the elongated member 672 of the motion converter 670 as shown in FIG. 8B.

According to various embodiments, the mouse 100 may include a transmission gear arrangement 698 coupled between the electric motor 653 and the motion converter 670. According to various embodiments, the transmission gear arrangement 698 may include at least one gear 699 between the pinion 696 and the electric motor 653. According to various embodiments, the transmission gear arrangement 698 may be a reduction gear arrangement.

According to various embodiments, the mouse 100 may include a switch 119 mounted to an exterior of the housing 110 (for example, see FIG. 1A). According to various embodiments, the switch 119 may be configured to activate the electric motor 653 to provide the rotary input motion to the motion converter 670 (to rotate the rotary member) for conversion into the output motion (e.g. linear output motion) to move the second free end portion 166 of the second lever arm 165 so as to pivot the lever 160 for engaging or disengaging the first free end portion 164 of the first lever arm 163 and the arresting surface 142 of the scroll wheel 140. According to various embodiments, the electric motor 653 may be configured to provide the rotary input motion in a first direction and in a second opposite direction. Accordingly, the switch 119 may be configured to activate the electric motor 653 to provide the rotary input motion in the first direction or in the second opposite direction. For example, the switch 119 may include a sliding switch which may be slidable between two positions, or may include a toggle button which may be toggled between two positions. Accordingly, the switch 119 may active the electric motor 653 to provide the rotary input motion in the first direction when the switch 119 is in the first position, and may active the electric motor 653 to provide the rotary input motion in the second opposite direction when the switch 119 is in the second position.

According to various embodiments, the electric motor 653 may also be activated by a software application installed in an external processor-based device, for example, including, but not limited to, a computer or a laptop or a notebook or a tablet. Based on a user input or a parameter set in an application running on the external processor-based device, a control signal may be sent from the external processor-based device to electronic circuit assembly of the mouse 100. The electronic circuit assembly of the mouse 100 may include a controller which may process the control signal to control the activation of the electric motor 653.

Figure 9A:
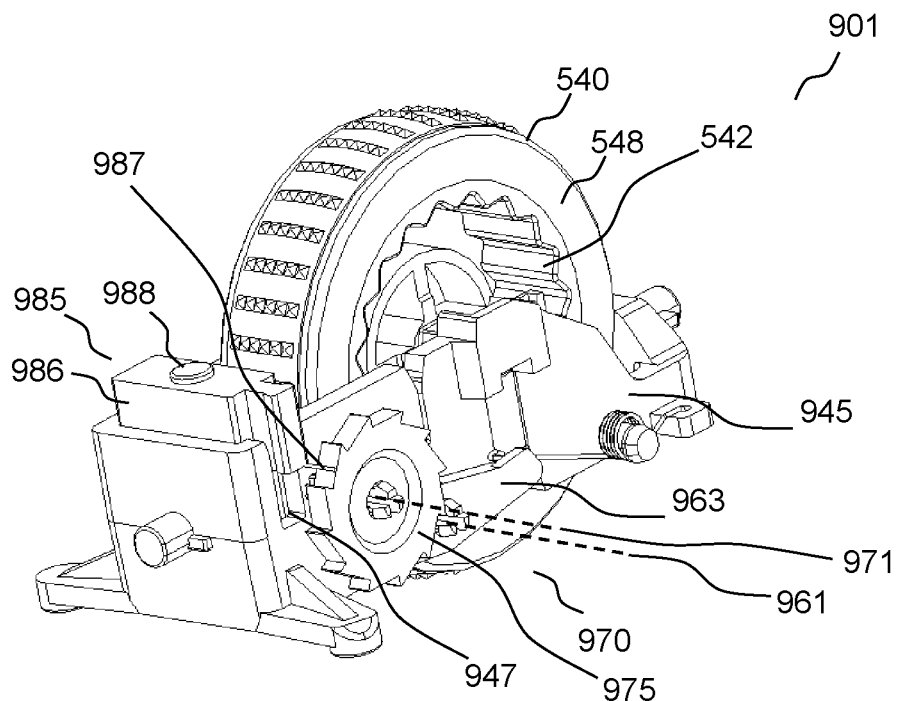
FIG. 9A and FIG. 9B show various views of another assembly of scroll wheel and a motion converter for the mouse of FIG. 1A according to various embodiments.
Figure 9B:
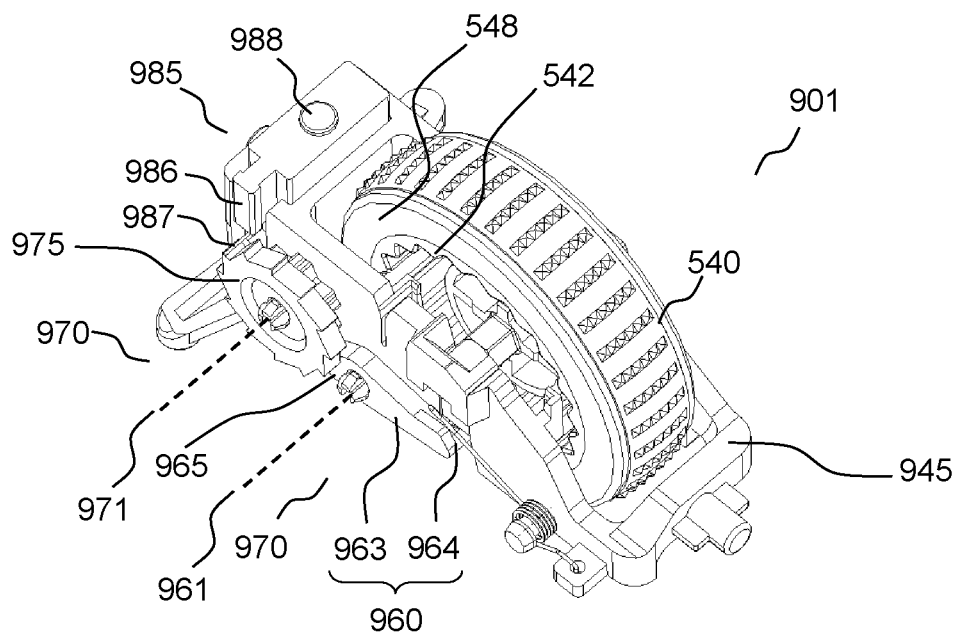

FIG. 9A and FIG. 9B show various views of another assembly 901 of the scroll wheel 540 and a motion converter 970 for the mouse 100 according to various embodiments.

According to various embodiments, the assembly 901 may include the scroll wheel 540 mounted on a scroll-wheel-bracket 945 which may, in turn, be mounted (e.g. detachably or securely mounted) to the base portion 130 of the housing 110 of the mouse 100 in a manner such that a part of the scroll wheel 540 is exposed from the housing 110 for a user of the mouse 100 to access the exposed part of the scroll wheel 540 to scroll the scroll wheel 540, while the remaining portion of the scroll wheel 540 and the scroll-wheel-bracket 945 may be housed within the cavity enclosed by the housing 110. Accordingly, the scroll wheel 540 may be rotatably mounted on the housing 110, for example, via the scroll-wheel-bracket 945.

According to various embodiments, the scroll-wheel-bracket 945 may be coupled to the base portion 130 of the housing 110. Hence, according to various embodiments, the scroll-wheel-bracket 945 may be a separate entity or component from the base 130 of the housing 110. According to various other embodiments, the scroll-wheel-bracket 945 may be integrally molded with the base portion 130 of the housing 110 and which may form an integral part of the base portion 130 of the housing 110.

As shown, the scroll wheel 540 may include a ring portion 548. The scroll wheel 540 may include the arresting surface 542 which may extend along an inner circumference of the ring portion 548. The arresting surface 542 may be directed (or facing) towards a centre of the ring portion 548. Thus, as shown, according to various embodiments, the arresting surface 542 may extend circumferentially along the inner surface of the ring portion 548 or may be disposed along the inner surface of the ring portion 548 or may form the inner surface of the ring portion 548. As an example, according to various embodiments, the ring portion 548 may include a metal material or may be a metal ring portion 548 which may be a separate entity or part from the arresting surface 542. Thus, according to various embodiments, the ring portion 548 may be integrated together (e.g. joint or assembled) with the arresting surface 542, for example, via gluing (e.g. using an adhesive) the ring portion 548 and the arresting surface 542 together, or joining the ring portion 548 and the arresting surface 542 together via an interference fit between the two parts or via an insert molding method. According to various other embodiments, the ring portion 548 and the arresting surface 542 may be integrally formed. For example, according to various other embodiments, the ring portion 548 and the arresting surface 542 may be a single entity or component which may be made, for example, from or may include a plastic (e.g. polymer) or metal material.

While the assembly 901 of FIG. 9A and FIG. 9B is shown as including the scroll wheel 540 of FIG. 5A and FIG. 5B, the assembly 901 is not limited thereto. For example, according to various other embodiments, the assembly 901 may include (in other words, may be compatible with) the scroll wheel 140 of FIG. 1A and FIG. 1B, as an alternative to the scroll wheel 540.

According to various embodiments, a lever 960, having a first lever arm 963 and a second lever arm 965, may be integrated into or mounted to the scroll-wheel-bracket 945. Hence, the lever 960 may also be mounted to the base portion 130 of the housing 110, via the scroll-wheel-bracket 945, between the first lever arm 963 and the second lever arm 965. The lever 960 may be pivotably mounted to the scroll-wheel-bracket 945 so as to be pivotable about a pivot axis 961 which extends between the first and second lever arm 963, 965. Accordingly, the lever 960 may be pivotable relative to the base portion 130 of the housing 110, as well as the scroll-wheel-bracket 945, about the pivot axis 961.

Figure 10A:
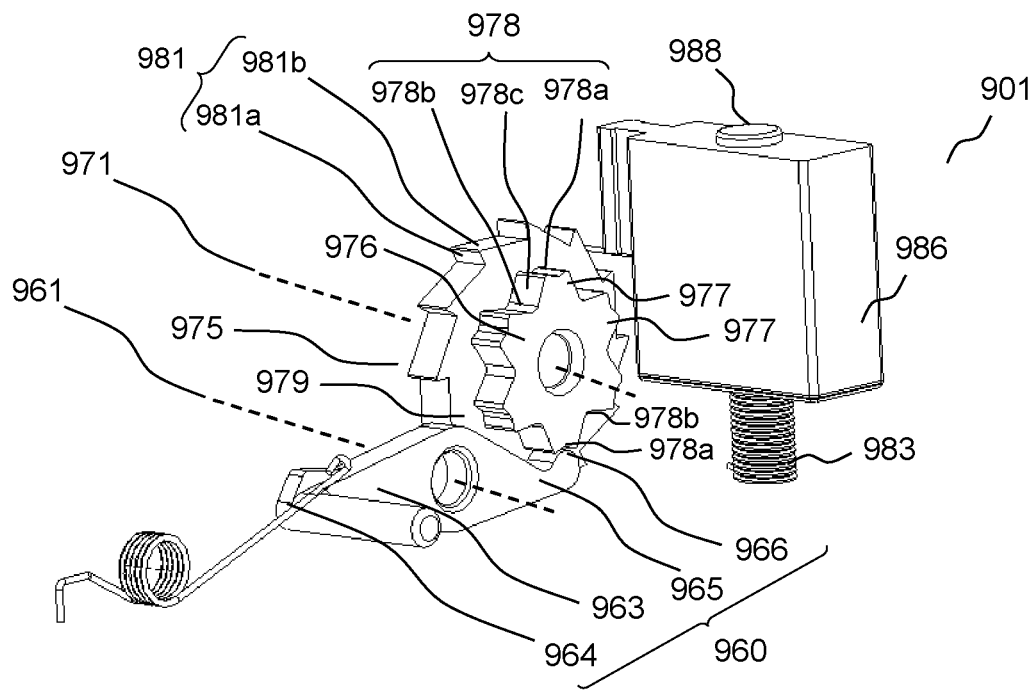
FIG. 10A shows a perspective view of a rotary member of the motion converter of the assembly of FIG. 9A in engagement with a lever of the assembly in the free-wheeling mode according to various embodiments.

According to various embodiments, the first and second lever arms 963, 965 of the lever 960 of the assembly 901 may form or extend along a substantially straight line (see FIG. 10A). In other words, both the first and second lever arms 963, 965 of the lever 960 may extend along a longitudinal axis of the lever 960. However, the assembly 901 is not limited thereto. For example, according to various other embodiments, the assembly 901 may include or may be compatible with another lever, such as the lever 160 of FIG. 3A to FIG. 3C, as an alternative to the lever 960.

According to various embodiments, the lever 960 may be pivotable about the pivot axis 961 to move a first free end portion 964 of the first lever arm 963 to engage (e.g. via a finger or a rod-shaped extension of the first lever arm 963) with the arresting surface 542 of the scroll wheel 540 for the scroll wheel 540 to be in the resistive-wheeling mode or to disengage from the arresting surface 542 of the scroll wheel 540 for the scroll wheel 540 to be in the free-wheeling mode.

According to various embodiments, the motion converter 970 may be integrated into or mounted to the scroll-wheel-bracket 945, which may be mounted to or may be integral with the base portion 130 of the housing 110. The motion converter 970 may include a rotary member 975 configured to be rotatable about a rotational axis 971 of the rotary member 975. The motion converter 970 may be configured to convert a rotational movement of the rotary member 975 into an output motion to move a second free end portion 966 of the second lever arm 965 so as to pivot the lever 960 about the pivot axis 961 for engaging or disengaging the first free end portion 964 of the first lever arm 963 and the arresting surface 542 of the scroll wheel 540. The motion convertor and the lever 960 may be arranged on the scroll-wheel-bracket 945 or relative to the housing 110 of the mouse 100 in a manner such that the rotational axis 971 of the rotary member 975 and the pivot axis 961 of the lever 960 may be substantially parallel to each other.

Figure 10B:
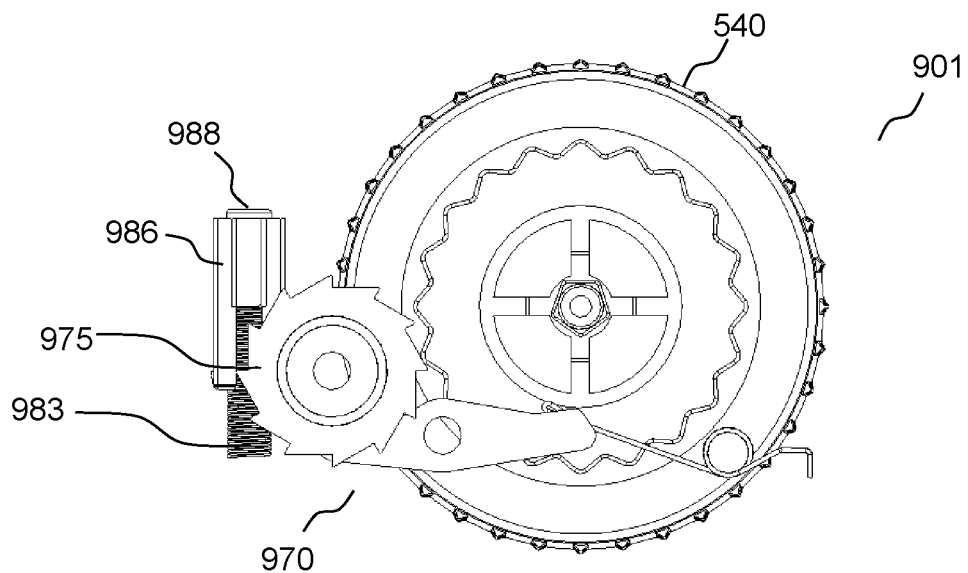
FIG. 10B shows a side view of the rotary member, the lever, and the scroll wheel of the assembly of FIG. 9A in the free-wheeling mode according to various embodiments.
Figure 11A:
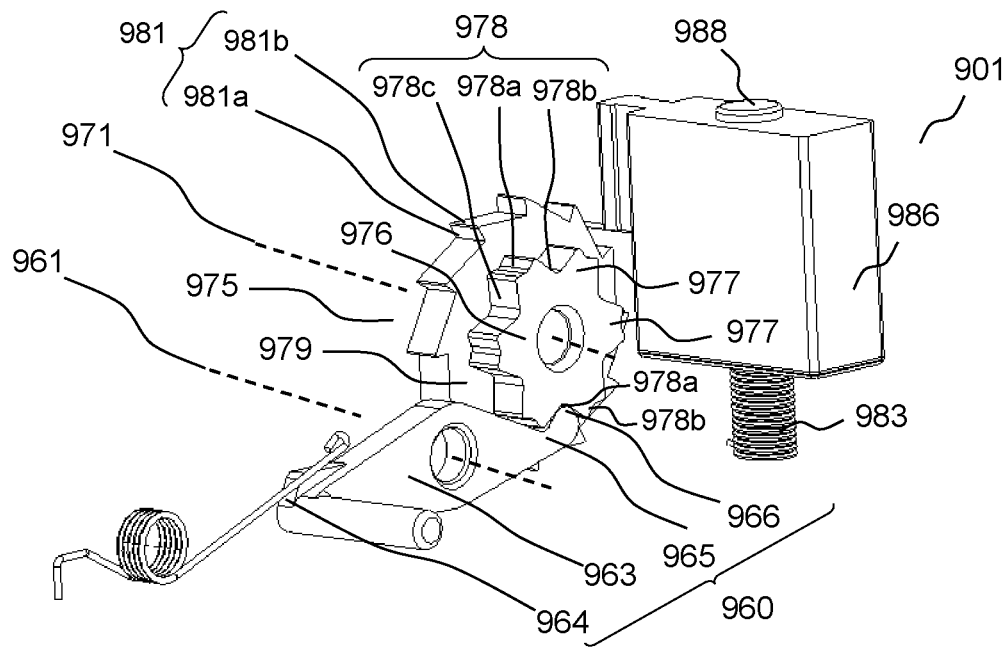
FIG. 11A shows a perspective view of the rotary member of the motion converter of the assembly of FIG. 9A in engagement with the lever of the assembly in the resistive-wheeling mode according to various embodiments.

FIG. 10A shows a perspective view of the rotary member 975 in engagement with the lever 960 in the free-wheeling mode according to various embodiments; FIG. 10B shows a side view of the rotary member 975, the lever 960, and the scroll wheel 540 in the free-wheeling mode according to various embodiments; FIG. 11A shows a perspective view of the rotary member 975 in engagement with the lever 960 in the resistive-wheeling mode according to various embodiments; and FIG. 11B shows a side view of the rotary member 975, the lever 960, and the scroll wheel 540 in the resistive-wheeling mode according to various embodiments.

With reference to FIG. 10A, according to various embodiments, the rotary member 975 of the assembly 901 may include a first gear-like portion 976. The rotational axis 971 may pass through a center of the first gear-like portion 976 such that the first gear-like portion 976 rotates about the rotational axis 971 when the rotary member 975 rotates about the rotational axis 971. As shown, the first gear-like portion 976 may include a plurality of teeth-like structures 977. According to various embodiments, an outline of the plurality of teeth-like structures 977 may form a continuous surface, which may function as a cam surface, for the second lever arm 965 to follow there-along when the rotary member 975 rotates as the rotary member 975 of the motion converter 970 is in engagement or in contact (e.g. constant or uninterrupted contact) with the second free end portion 966 of the second lever arm 965. According to various embodiments, the continuous surface of the plurality of teeth-like structures 977 of the first gear-like portion 976 may provide a undulating profile to serve as a cam surface. According to various embodiments, the continuous surface may include regions serving as engagement surfaces configured to or for being engaged with the second free end portion 966 of the second lever arm 965. Further, different engagement surfaces 978 may be disposed or arranged at different radial distances away from the rotational axis 971 of the rotary member 975. With reference to FIG. 10A, according to various embodiments, a first engagement surface 978a may be at a tip of each tooth-like structure 977 of the plurality of teeth-like structures 977 of the first gear-like portion 976 of the rotary member 975 which may be at a first radial distance away from the rotational axis 971. Further, according to various embodiments, a second engagement surface 978b may be at a valley between two teeth-like structures 977 which may be at a second radial distance away from the rotational axis 971. According to various embodiments, the first and second radial distances may be different radial distances from each other.

As shown in FIG. 10A, according to various embodiments, the first radial distance may be larger than the second radial distance measured from the rotational axis 971 of the rotary member 975, such that the first engagement surface 978a is further away from the rotational axis 971 of the rotary member 975 than the second engagement surface 978b from the same rotational axis 971. Accordingly, when the second free end portion 966 is engaged (or in contact) with the first engagement surface 978a such that the second free end portion 966 of the second lever arm 965 of the lever 960 is further away from the rotational axis 971 of the rotary member 975, the lever 960 may be in a disposition in which the first free end portion 964 of the first lever arm 963 is disengaged from the arresting surface 542 of the scroll wheel 540 (as shown in FIG. 10B). In other words, when the second free end portion 966 of the second lever arm 965 of the lever 960 is engaged with the first engagement surface 978a, the lever 960 may be in the disposition in which the first free end portion 964 of the first lever arm 963 is pivoted away from the arresting surface 542 of the scroll wheel 540 and disengaged from the arresting surface 542 so to be in the free-wheeling mode. Accordingly, according to various embodiments, the second free end portion 966 of the second lever arm 965 in engagement with the first engagement surface 978a of the first gear-like portion 976 of the rotary member 975 may correspond to the lever pivoted into the disposition whereby the first free end portion 964 of the first lever arm 963 is disengaged from the arresting surface 542 of the scroll wheel 540 for the scroll wheel 540 to be in the free-wheeling mode.

Figure 11B:
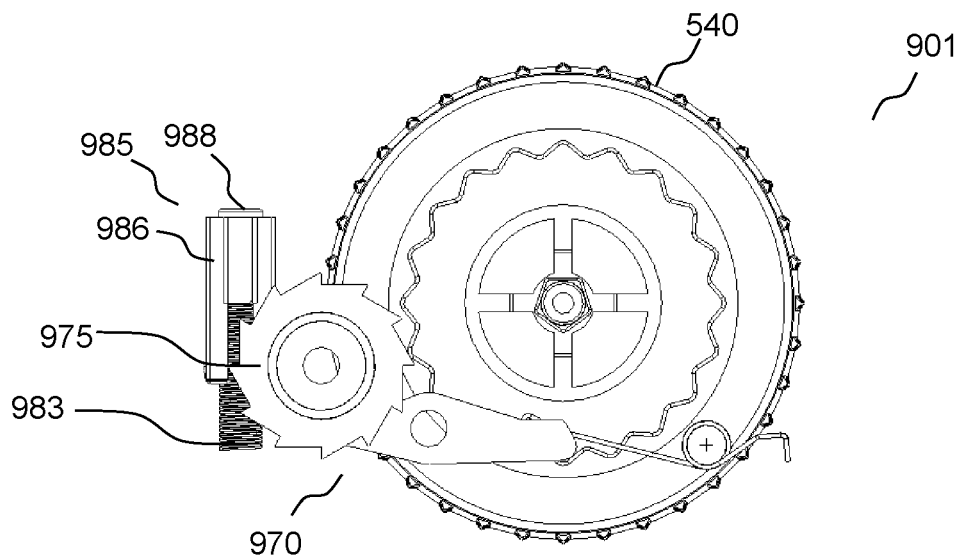
FIG. 11B shows a side view of the rotary member, the lever, and the scroll wheel of the assembly of FIG. 9A in the resistive-wheeling mode according to various embodiments.

Further, as shown in FIG. 11A, according to various embodiments, when the second free end portion 966 is engaged with the second engagement surface 978b, such that the second free end portion 966 is nearer to the rotational axis 971 of the rotary member 975, the lever 960 may be in a disposition in which the first free end portion 964 of the first lever arm 963 of the lever 960 may be engaged with or arresting the arresting surface 542 of the scroll wheel 540 (as shown in FIG. 11B). In other words, when the second free end portion 966 of the second lever arm 965 of the lever 960 is engaged with the second engagement surface 978b of the first gear-like portion 976 of the rotary member 975, the lever 960 may be in the disposition in which the first free end portion 964 of the first lever arm 963 may be pivoted to engage or arrest the arresting surface 542 of the scroll wheel 540 to be in the resistive-wheeling mode. Accordingly, according to various embodiments, the second free end portion 966 of the second lever arm 965 in engagement with the second engagement surface 978b of the first gear-like portion 976 of the rotary member 975 may correspond to the lever pivoted into the disposition whereby the first free end portion 964 of the first lever arm 963 is engaged with the arresting surface 542 of the scroll wheel 540 for the scroll wheel 540 to be in the resistive-wheeling mode.

According to various embodiments, the first and second engagement surfaces 978a, 978b of the first gear-like portion 976 of the rotary member 975 may be disposed or arranged in an alternating manner about or around the rotational axis 971 of the rotary member 975, as shown in FIG. 10A and FIG. 11A.

According to various embodiments, the plurality of teeth-like structures 977 of the first gear-like portion 976 of the rotary member 975 may additionally include at least one intermediate (or further) engagement surface (not shown) disposed at an intermediate radial distance, between the first and second radial distances of the first and second engagement surfaces 978a, 978b, measured from the rotational axis 971 of the rotary member 975. Accordingly, according to various embodiments, the second free end portion 966 of the second lever arm 965 in engagement with the intermediate engagement surface of the first gear-like portion 976 of the rotary member 975 may correspond to the lever pivoted into the disposition whereby the first free end portion 964 of the first lever arm 963 is engaged with the arresting surface 542 of the scroll wheel 540 for the scroll wheel 540 to be in the resistive-wheeling mode. However, the first free end portion 964 of the first lever arm 963 may engage with the arresting surface 542 of the scroll wheel 540, with a lower resistive force (corresponding to a weaker detent force or "arresting" force), against scrolling movement of the scroll wheel 540 experienced by the user, than the resistive force engendered by the resistive-wheeling mode corresponding to the second free end portion 966 of the second lever arm 965 in engagement with the second engagement surface 978b of the first gear-like portion 976 of the rotary member 975 (as described with reference to FIG. 11A and FIG. 11B). Therefore, according to various embodiments, there may be provided a plurality of intermediate engagement surfaces disposed at different radial distances from each other, measured from the rotational axis 971 of the rotary member 975, with the plurality of intermediate engagement surfaces corresponding to different levels of resistive forces with respect to scrolling the scroll wheel 540. According to various embodiments, one or more intermediate engagement surface(s) may be disposed between a respective first engagement surface 978a and a respective second engagement surface 978b of the first gear-like portion 976 of the rotary member 975. For example, according to various embodiments, the plurality of engagement surfaces 978 may be arranged in the following sequence, along a first rotational direction about the rotational axis 971 of the rotary member 975: first engagement surface 978a, intermediate engagement surface (not shown), second engagement surface 978b, intermediate engagement surface, first engagement surface 978a . . . etc. According to various other embodiments, one or more intermediate engagement surface(s) (i.e. corresponding to different levels of resistive forces) may be disposed between a pair of neighboring (or closest) first engagement surfaces 978a, or between a pair neighboring second engagement surfaces 978b. For example, according to various other embodiments, the plurality of engagement surfaces 978 may be arranged in the following sequence, along the first rotational direction about the rotational axis 971 of the rotary member 975: first engagement surface 978a, intermediate engagement surface(s), first engagement surface 978a, second engagement surface 978b, one or more intermediate engagement surface(s), second engagement surface 978b, first engagement surface 978a, one or more intermediate engagement surface(s), first engagement surface 978a . . . etc. According to various embodiments, the plurality of engagement surfaces 978 may be arranged in any other sequence, in which immediately adjacent engagement surfaces are at different radial distances, measured from the rotational axis 971, from each other.

According to various embodiments, the plurality of teeth-like structures 977 of the first gear-like portion 976 of the rotary member 975 may include a connecting-surface 978c, connecting or adjoining a respective pair or each pair of neighboring engagement surfaces 978 which are disposed at different radial distances (i.e. with respect to the rotational axis 971) from each other, for facilitating movement (e.g. sliding movement, or travel) of the second free end portion 966 of the second lever arm 965 across the plurality of teeth-like structures 977 of the first gear-like portion 976 of the rotary member 975, from one engagement surface 978 to another engagement surface 978 which are disposed at different radial distances, measured from the rotational axis 971, from each other. Accordingly, each connecting-surface 978c may be slopped or inclined to connect two adjacent engagement surfaces 978 at different radial distances from the rotational axis 971.

Accordingly, as described herein, according to various embodiments, the first gear-like portion 976 of the rotary member 975 of the motion converter 970 may include the plurality of teeth-like structures 977 configured to or for engaging the second free end portion 966 of the second lever arm 965 to cause the second free end portion 966 of the second lever arm 965 to follow the profile or outline of the plurality of teeth-like structures 977 of the first gear-like portion 976. Hence, as the rotary member 975 rotates, the second free end portion 966 of the second lever arm 965 may be moved so as to pivot the lever 960 about the pivot axis 961 between the resistive-wheeling mode and the free-wheeling mode.

With reference to FIG. 10A and FIG. 11A, according to various embodiments, the first gear-like portion 976 of the rotary member 975 may be at a first segment of the rotational axis 971 of the rotary member 975. Further, according to various embodiments, the rotary member 975 may further include a second gear-like portion 979, which may be at a second segment of the rotational axis 971 of the rotary member 975. According to various embodiments, the first segment of the rotational axis 971 and the second segment of the rotational axis 971 may be side-by-side along the rotational axis 971. Accordingly, the first gear-like portion 976 of the rotary member 975 and the second gear-like portion 979 of the rotary member 975 may be in a side-by-side arrangement along the rotational axis 971. As shown, according to various embodiments, the second gear-like portion 979 may be adjoined and adjacent to the first gear-like portion 976. Accordingly, the first and second gear-like portion 979s may be integral (e.g. integrally molded) with each other. According to various other embodiments, the first and second gear-like portion 979s may be integrated (e.g. joint or assembled) together, for example, via gluing (e.g. using an adhesive) the first and second gear-like portion 979s together, or joining the first and second gear-like portion 979s together via an interference fit or snap fit latches between the first and second gear-like portion 979s.

According to various embodiments, the second gear-like portion 979 may be configured to receive the input motion or force to rotate the rotary member 975. For example, as shown in FIG. 10A and FIG. 11A, according to various embodiments, the second gear-like portion 979 may include a plurality of teeth (e.g. unsymmetrical teeth) 981 protruding radially along a circumference of the second gear-like portion 979 of the rotary member 975. The teeth (e.g. unsymmetrical teeth) 981 may be configured to receive an input motion or force, acting on at least one tooth (e.g. unsymmetrical tooth) 981, to or for rotating the rotary member 975. For example, the input motion or force may push the tooth 981 (e.g. along a linear path in a direction tangent to the circumference of the second gear-like portion 979) of the rotary member 975 to rotate the rotary member 975. Each tooth (e.g. unsymmetrical tooth) 981 may include a first side wall 981a which may be substantially parallel to a radial direction extending from the rotational axis 971. Further, the first side wall (s) 981 of all teeth (e.g. unsymmetrical teeth) 981 may be arranged to face against a first (or a same) rotational direction about the rotational axis 971 of the rotary member 975. Further, each tooth (e.g. unsymmetrical tooth) 981 may include second side wall 981b, opposite the first side wall 981a of the tooth. The second side wall 981b of each tooth 981 may be inclined or curved with respect to the first side wall 981a of the tooth 981. For example, as shown, the second side wall 981b of each tooth 981 may be disposed or arranged at an acute angle with respect to the first side wall 981a of the tooth 981. According to various embodiments, the plurality of teeth 981 may be identical (e.g. substantially identical) with each other. Accordingly, according to various embodiments, an apex of each tooth 981 (i.e. joint between the first and second side walls 981a, 981b) may be at a same radial distance away from the rotational axis 971 of the rotary member 975 as the remaining tooth or teeth 981. According to various embodiments, the second gear-like portion 979 may resemble a ratchet teeth gear.

According to various other embodiments, the second gear-like portion 979 may be integral with the first gear-like portion 976 to form the rotary member 975. Accordingly, the first gear-like portion 976 and the second gear-like portion 979 may be rotated in a synchronous manner as a single rotary member 975. Hence, providing the input motion or force to rotate the second gear-like portion 979 may rotate the first gear-like portion 976 at the same time.

Referring to FIG. 10A and FIG. 11A, according to various embodiments, each engagement surface 978 (e.g. the first engagement surface(s) 978a, the second engagement surface(s) 978b, and/or the intermediate engagement surface(s) (not shown)) of the first gear-like portion 976 of the rotary member 975 and the second free end portion 966 of the second lever arm 965 of the lever 960 may be respectively configured or shaped to be inter-engageable or capable of mating with each other so as to be capable of holding (e.g. releasably holding or releasably securing) the lever 960 in place (e.g. at a desired mode), when none or an insufficient (in other words, less than a predetermined threshold) input motion or input force is applied to the rotary member 975 (e.g. in an attempt to rotate the rotary member 975). Accordingly, each engagement surface 978 may be shaped to correspond with a shape of the second free end portion 966 of the second lever arm 965 to inter-engage with each other for holding the lever 960 in place. For example, as shown, according to various embodiments, each engagement surface 978 of the first gear-like portion 976 of the rotary member 975 may include or may define a concaved (or concave-like) surface portion configured to receive and/or inter-engage or mate with a corresponding convex (or convex-like) surface portion of the second free end portion 966 of the second lever arm 965 of the lever 960.

Referring back to FIG. 9A and FIG. 9B, according to various embodiments, the assembly 901 may include a user-input unit 985 which may include a linear actuation member 986. The user-input assembly 985 may be mounted to or supported by the scroll-wheel-bracket 945 for providing, via the linear actuation member 986, the input motion (e.g. linear motion) to the rotary member 975 to rotate the rotary member 975. For example, the linear actuation member 986 may engage or contact the first side wall 981a of one tooth 981 of the second gear-like portion 979 of the rotary member 975, to push the tooth 981 of the rotary member 975, as the linear actuation member 986 moves through a linear motion, to rotate the rotary member 975. Hence, according to various embodiments, the scroll-wheel-bracket 945 may include a straight (e.g. substantially straight) channel 947 configured to support and/or slidably receive therewithin and/or guide there-along the linear actuation member 986. In other words, the linear actuation member 986 of the user-input unit 985 may move along an actuating distance corresponding to a depth or length of the channel 947.

According to various embodiments, the linear actuation member 986 may be biased, by an actuation-member-biasing element 983, in or towards an extended (or undepressed) position with respect to channel 947 or the scroll-wheel-bracket 945 (or the housing 110 of the mouse 100). For example, the user-input unit 985 may include the actuation-member-biasing element 983, such as a spring (e.g. compression spring) or any other suitable resilient material (e.g. foam, high rebound foam, memory foam, etc.), in engagement with the linear actuation member 986 and disposed within or inside the scroll-wheel-bracket 945, in a manner so as to urge against movement of the linear actuation member 986 from the extended (undepressed) position to a retracted (e.g. depressed) position such that actuation-member-biasing element 983 may return the linear actuation member 986 back to the extended (undepressed) position upon removal of the depression force. According to various embodiments, the user-input unit 985 may further include a locking mechanism (e.g. a push-push mechanism, or any other suitable locking or latching mechanism etc.) configured to releasably hold the linear actuation member 986 in the retracted (e.g. depressed) position with respect to the channel 947 or the scroll-wheel-bracket 945 (or the housing 110 of the mouse 100), when the linear actuation member 986 is depressed from the extended position to the retracted position.

According to various embodiments, the user-input unit 985 may further include an engagement tab member 987 configured to move in tandem (in other words, simultaneously) and/or alongside (in other words, along and beside) the linear actuation member 986. According to various embodiments, the engagement tab member 987 may be integral or affixed to either one or both of the linear actuation member 986 and/or a portion of the biasing element 983 (e.g. a top or upper portion of the biasing element 983, or a portion of the biasing element 983 immediate adjacent or adjoining the linear actuation member 986). According to various embodiments, the engagement tab member 987 may be protruding or extending from a side of the linear actuation member 986. According to various embodiments, the user-input unit 985 may be disposed such that the engagement tab member 987 may be proximate to the second gear-like portion 979 of the rotary member 975, for example, proximate to the plurality of teeth (e.g. unsymmetrical teeth) 981 of the second gear-like portion 979 such that a tooth (e.g. unsymmetrical tooth) 981 is in (or obstructing) the path (e.g. actuating path) of the engagement tab member 987. Accordingly, as the linear actuation member 986 moves (e.g. is depressed) through the actuating distance, the engagement tab member 987 may engage and push (e.g. along the actuating path) the first side wall 981a of one tooth 981 of the second gear-like portion 979 to rotate the rotary member 975 about the rotational axis 971. According to various embodiments, the engagement tab member 987 may be in the form of a post or a pole or a bar or a finger or a rod or a stick or any other suitable component.

According to various embodiments, each tooth 981 (e.g. an apex of each tooth or blade etc.) of the second gear-like portion 979 of the rotary member 975 may be radially aligned with a respective engagement surface 978 of the first gear-like portion 976 of the rotary member 975. Further, the plurality of teeth 981 of the second gear-like portion 979, together with the corresponding radially aligned respective engagement surfaces 978, may be spaced at regular (or equal) intervals from one another about the rotational axis 971. Accordingly, each actuation (e.g. depression) of the linear actuation member 986 may correspond to or cause a single change or shift in mode, for example, from the free-wheeling mode to the resistive-wheeling mode, or from the resistive-wheeling mode to the free-wheeling mode, or between different resistance in the resistive-wheeling mode etc.

According to various embodiments, the linear actuation member 986 may be actuated by depressing a free end 988 (e.g. top or upper end) of the linear actuation member 986 using a button (e.g. push button 129 of the mouse 100 shown in FIG. 1A) mounted on the housing 110 of the mouse 100. For example, the button (e.g. push button) 129 of the mouse 100 may be configured to engage with and actuate the linear actuation member 986 with each depression of the button 129.

Figure 12A:
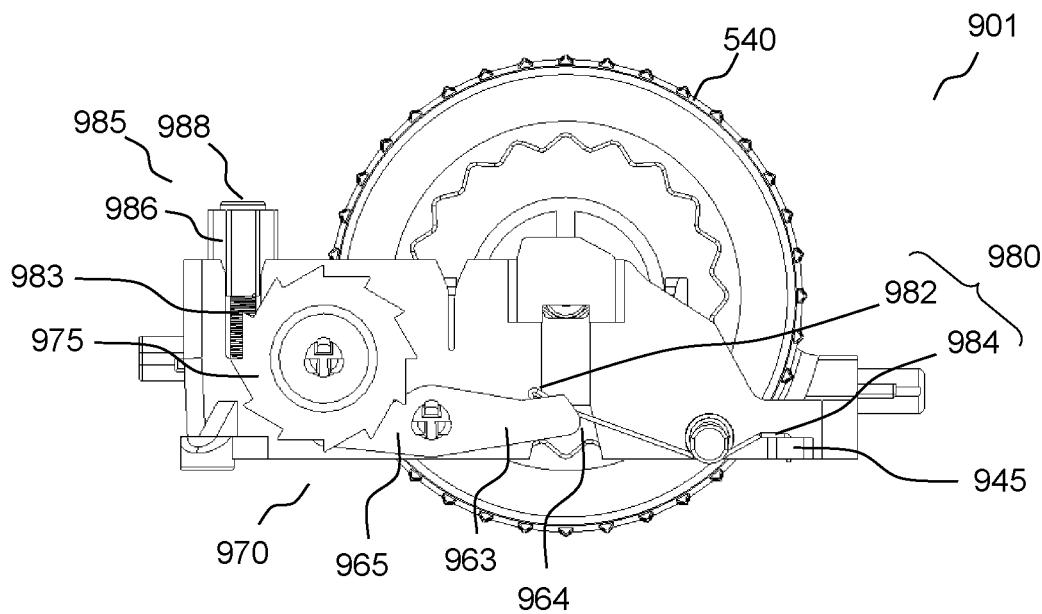
FIG. 12A shows a side view of the assembly of FIG. 9A in the free-wheeling mode, with a biasing mechanism for exerting a biasing force on the lever according to various embodiments.
Figure 12B:
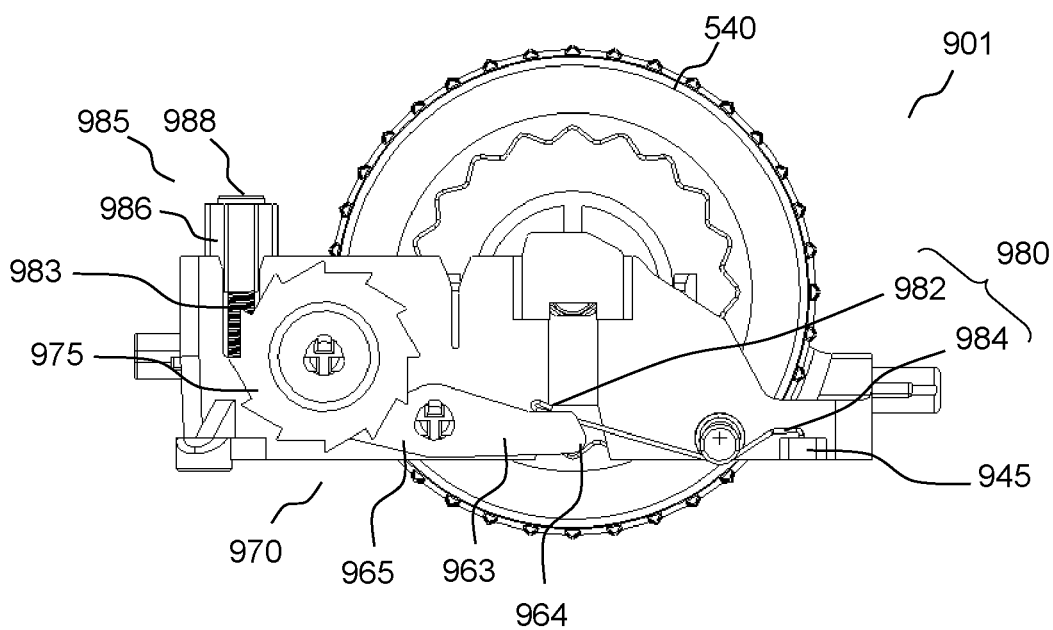
FIG. 12B shows a side view of the assembly of FIG. 9A in the resistive-wheeling mode, with the biasing mechanism according to various embodiments.

FIG. 12A shows a side view of the assembly 901 in the free-wheeling mode, with a biasing mechanism 980 mounted to the scroll-wheel-bracket 945 for exerting a biasing force on the first lever arm 963 according to various embodiments; and FIG. 12B shows a side view of the assembly 901 in the resistive-wheeling mode, with the biasing mechanism 980 for exerting the biasing force on the first lever arm 963 according to various embodiments.

Referring to FIG. 12A and FIG. 12B, the assembly 901 may include the biasing mechanism 980 mounted on or fixed to the scroll-wheel-bracket 945. As shown, according to various embodiments, a first end 982 of the biasing mechanism 980 may be in engagement or connected to the first lever arm 963 of the lever 960 and a second end 984 of the biasing mechanism 980 may be mounted or fixed to the scroll-wheel-bracket 945. The biasing mechanism 980 may be configured to apply or exert a biasing force on the first free end portion 964 of the first lever arm 963 in a direction towards the arresting surface 542 so as to bias the first free end portion 964 of the first lever arm 963 towards the arresting surface 542 of the scroll wheel 540. Accordingly, the biasing mechanism 980 in engagement with the first lever arm 963 of the lever 960, together with the rotary member 975 in engagement with the second lever arm 965 of the lever 960, may serve to prevent the mechanisms (e.g. the lever 960, and any intermediate components between the rotary member 975 and the biasing mechanism 980) from loosening while in a specific or intended mode (e.g. free-wheeling mode, or resistive-wheeling mode). Thus, when the assembly 901 is in the resistive-wheeling, the biasing mechanism 980 in engagement with the first lever arm 963 may also serve to clamp or secure the first lever arm 963 to the arresting surface 542 so as to prevent the assembly 901 from unintentionally breaking away from the resistive-wheeling mode. As shown, according to various embodiments, the biasing mechanism 980 may be or may include a spring, such as a torsion spring, or a lever spring, etc.

According to various embodiments, there is provided an input device for communication with a processor-based device. The input device may include a housing. The input device may also include a scroll wheel which is mounted on the housing in a manner so as to be rotatable about a first axis and so as to be partly exposed from the housing to be accessible by a user of the input device. The scroll wheel may include an arresting surface which extends circumferentially about the first axis. The input device may further include a lever which is provided with first and second lever arms and which is mounted on the housing so as to be pivotable about a pivot axis which extends between the first and second lever arms. A first free end portion of the first lever arm may be configured to engage the arresting surface of the scroll wheel with an engagement force to arrest a rotation of the scroll wheel with a corresponding arresting force. The input device may further include an auxiliary wheel which is mounted on the housing in a manner so as to be rotatable about a second axis and so as to be partly exposed from the housing to be accessible by the user. The input device may further include a motion converter connected to the auxiliary wheel as well as to a second free end portion of the second lever arm. The motion converter may be configured to convert a rotational motion of the auxiliary wheel into a linear motion and to apply said linear motion to the second free end portion of the second lever arm so as to pivot the lever about the pivot axis to correspondingly adjust the engagement force exerted by the first free end portion of the first lever arm on the arresting surface of the scroll wheel, whereby the corresponding arresting force applied to the scroll wheel may be correspondingly adjustable by rotation of the auxiliary wheel.

According to various embodiments, the first axis of the scroll wheel of the input device, the second axis of the auxiliary wheel of the input device and the pivot axis of the lever of the input device may be at least substantially parallel to each other.

According to various embodiments, a portion of the auxiliary wheel of the input device may be exposed through an opening. The opening may be in a recess of the housing of the input device.

According to various embodiments, the arresting surface of the scroll wheel of the input device may include a plurality of serrations.

According to various embodiments, the first free end portion of the first lever arm of the lever of the input device may include a finger configured to fit into a respective notch between respective two adjacent serrations of the plurality of serrations of the arresting surface of the scroll wheel of the input device.

According to various embodiments, the input device may further include a biasing mechanism connected to the first lever arm to apply a biasing force on the first free end portion of the first lever arm so as to bias the first free end portion of the first lever arm towards the arresting surface of the scroll wheel to exert the engagement force by the first free end portion of the first lever arm on the arresting surface of the scroll wheel.

According to various embodiments the motion converter of the input device may be configured to apply the linear motion to the second free end portion of the second lever arm to pivot the lever about the pivot axis so as to correspondingly counter the biasing force exerted by the biasing mechanism on the first free end portion of the first lever arm to correspondingly adjust the engagement force exerted by the first free end portion of the first lever arm on the arresting surface of the scroll wheel.

According to various embodiments, the biasing mechanism of the input device may include a torsion spring.

According to various embodiments, the motion converter of the input device may include an elongated member which may be configured to be movable linearly along a longitudinal axis of the elongated member and which may be connected to the second free end portion of the second lever arm so as to apply the linear motion to the second free end portion of the second lever arm.

According to various embodiments, the motion converter of the input device may include a rack and pinion mechanism, wherein the elongated member of the motion converter may be connected to the rack, and the pinion of the motion converter may be connected to the auxiliary wheel.

According to various embodiments, the motion converter of the input device may include a nut and screw shaft mechanism, wherein the elongated member of the motion converter may be connected to the screw shaft, and the roller of the motion converter may be connected to the auxiliary wheel.

According to various embodiments, the motion converter of the input device may include a crank and slider mechanism, wherein the elongated member of the motion converter may be connected to the slider, and the crank of the motion converter may be connected to the auxiliary wheel.

According to various embodiments, the lever of the input device may include an elongated connection section which forms a pivot axle defining the pivot axis of the lever and via which the first and second lever arms are fixedly connected to each other, wherein the pivot axle extends at least substantially perpendicular to a respective longitudinal extension direction of both the first and second lever arms.

According to various embodiments, the elongated connection section of the lever of the input device may include first and second section ends which are connected to a first connection end, opposite to the first free end portion, of the first lever arm and to a second connection end, opposite to the second free end portion, of the second lever arm, respectively.

According to various embodiments, there is provided an input device for communication with a processor-based device. The input device may include a housing. The input device may also include a rotatable scroll wheel which is mounted on the housing so as to be partly exposed from the housing to be accessible by a user of the input device. The scroll wheel may include an arresting surface. The input device may further include a lever which is provided with first and second lever arms and which is pivotably mounted to the housing between the first and second lever arms. The lever may be pivotable to move a first free end portion of the first lever arm to engage with or disengage from the arresting surface of the scroll wheel so as to interchange the scroll wheel between a free-wheeling mode and a resistive-wheeling mode. The input device may further include a rotary to linear motion converter having a rotary input axis or rotational axis and a linear output axis. The rotary to linear motion converter being in engagement with a second free end portion of the second lever arm. The rotary to linear motion converter may be configured to convert a rotary input motion or rotational movement about the rotary input axis or rotational axis into an output motion or linear output motion along the linear output axis for moving the second free end portion of the second lever arm so as to pivot the lever about the pivot axis for engaging or disengaging the first free end portion of the first lever arm and the arresting surface of the scroll wheel. The pivot axis of the lever and the rotary input axis or rotational axis of the rotary to linear motion converter may be substantially parallel to each other.

According to various embodiments, the arresting surface of the scroll wheel may include a plurality of serrations. According to various embodiments, the first free end portion of the first lever arm may include a finger configured to fit into a respective notch between respective two adjacent serrations of the plurality of serrations of the arresting surface.

According to various embodiments, the lever may include an elongated connection section which may form a pivot axle defining the pivot axis of the lever and via which the first and second lever arms may be fixedly connected to each other. According to various embodiments, the pivot axle may extend at least substantially perpendicular to a respective longitudinal extension direction of both the first and second lever arms.

According to various embodiments, the elongated connection section may include first and second section ends which may be connected to a first connection end, opposite to the first free end portion, of the first lever arm and to a second connection end, opposite to the second free end portion, of the second lever arm, respectively.

According to various embodiments, the input device may further include an electric motor coupled to the rotary to linear motion converter to provide the rotary input motion or rotational movement for conversion into the output motion or linear output motion to move the second free end portion of the second lever arm.

According to various embodiments, the input device may further include a switch mounted to an exterior of the housing, the switch may be configured to activate the electric motor to provide the rotary input motion or rotational movement in a first direction or in a second opposite direction.

According to various embodiments, the rotary to linear motion converter may include an elongated member which may be configured to be movable linearly along a longitudinal axis of the elongated member and which may be in engagement with the second free end portion of the second lever arm so as to move the second free end portion of the second lever arm as the elongated member is moved linearly by the output motion or linear output motion of the rotary to linear motion converter.

According to various embodiments, there is provided an input device for communication with a processor-based device. The input device may include a housing. The input device may also include a rotatable scroll wheel which is mounted on the housing so as to be partly exposed from the housing to be accessible by a user of the input device. The scroll wheel may include an arresting surface. The input device may further include a lever which is provided with first and second lever arms and which is pivotably mounted to the housing between the first and second lever arms. The lever may be pivotable to move a first free end portion of the first lever arm to engage with or disengage from the arresting surface of the scroll wheel so as to interchange the scroll wheel between a free-wheeling mode and a resistive-wheeling mode. The input device may further include a rotary to linear motion converter in engagement with a second free end portion of the second lever arm. The rotary to linear motion converter may be configured to convert a rotary input motion or rotational movement into an output motion or linear output motion for moving the second free end portion of the second lever arm so as to pivot the lever about the pivot axis for engaging or disengaging the first free end portion of the first lever arm and the arresting surface of the scroll wheel. The rotary to linear motion converter may include an elongated member which is configured to be movable linearly along a longitudinal axis of the elongated member and which is in engagement with the second free end portion of the second lever arm so as to move the second free end portion of the second lever arm as the elongated member is moved linearly by the output motion or linear output motion of the rotary to linear motion converter.

According to various embodiments, the elongated member may include a projection to engage the second free end portion of the second lever arm, wherein the projection may be protruding from the elongated member in a protrusion direction perpendicular to the longitudinal axis of the elongated member. According to various embodiments, the projection may include an inclined surface, wherein the second free end portion of the second lever arm may be engaged to a longitudinal side of the elongated member from which the projection protrudes such that moving the elongated member linearly along the longitudinal axis of the elongated member may cause the second free end portion of the second lever arm to slide along the inclined surface of the projection to move the second free end portion of the second lever arm along the protrusion direction perpendicular to the longitudinal axis of the elongated member for pivoting the lever.

According to various embodiments, the elongated member may include a spring-loaded pusher adjacent to a tip of the projection and directed in the protrusion direction perpendicular to the longitudinal axis of the elongated member, wherein moving the elongated member linearly along the longitudinal axis of the elongated member may cause the second free end portion of the second lever arm to slide on or off the spring-loaded pusher. According to various embodiments, the spring-loaded pusher may include a pusher member movable in the protrusion direction perpendicular to the longitudinal axis of the elongated member and a biasing element arranged to bias the pusher member away from the longitudinal side of the elongated member in the protrusion direction perpendicular to the longitudinal axis of the elongated member.

According to various embodiments, the second free end portion of the second lever arm may include a V-shaped cross-sectional profile, wherein a bottom of the V-shaped cross-sectional profile may be directed perpendicularly from the second lever arm.

According to various embodiments, the input device may further include an electric motor coupled to the rotary to linear motion converter to provide the rotary input motion or rotational movement for conversion into the output motion or linear output motion to move the second free end portion of the second lever arm. According to various embodiments, the pivot axis of the lever and a rotational driving axis of the electric motor may be substantially parallel to each other.

According to various embodiments, there is provided an input device for communication with a processor-based device. The input device may include a housing. The input device may also include a rotatable scroll wheel which is mounted on the housing so as to be partly exposed from the housing to be accessible by a user of the input device. The scroll wheel may include an arresting surface. The input device may further include a lever which is provided with first and second lever arms and which is pivotably mounted to the housing between the first and second lever arms. The lever may be pivotable to move a first free end portion of the first lever arm to engage with or disengage from the arresting surface of the scroll wheel so as to interchange the scroll wheel between a free-wheeling mode and a resistive-wheeling mode. The input device may further include a rack and pinion motion converter in engagement with a second free end portion of the second lever arm. The rack and pinion converter may be configured to convert a rotary input motion or rotational movement into an output motion or linear output motion for moving the second free end portion of the second lever arm so as to pivot the lever about the pivot axis for engaging or disengaging the first free end portion of the first lever arm and the arresting surface of the scroll wheel. The pivot axis of the lever and a rotary input axis or rotational axis of the rack and pinion motion converter may be substantially parallel to each other. The rack and pinion motion converter may include an elongated member which is configured to be movable linearly along a longitudinal axis of the elongated member and which is in engagement with the second free end portion of the second lever arm so as to move the second free end portion of the second lever arm as the elongated member is moved linearly by the output motion or linear output motion of the rack and pinion motion converter.

According to various embodiments, the arresting surface of the scroll wheel may include a plurality of serrations, wherein the first free end portion of the first lever arm may include a finger configured to fit into a respective notch between respective two adjacent serrations of the plurality of serrations of the arresting surface.

According to various embodiments, the lever may include an elongated connection section which may form a pivot axle defining the pivot axis of the lever and via which the first and second lever arms may be fixedly connected to each other, wherein the pivot axle may extend at least substantially perpendicular to a respective longitudinal extension direction of both the first and second lever arms, wherein the elongated connection section may include first and second section ends which may be connected to a first connection end, opposite to the first free end portion, of the first lever arm and to a second connection end, opposite to the second free end portion, of the second lever arm, respectively.

According to various embodiments, the input device may further include an electric motor coupled to the rack and pinion motion converter to provide the rotary input motion for conversion of the rotational movement of the rotary member of the motion converter into the output motion (e.g. linear output motion) to move the second free end portion of the second lever arm.

According to various embodiments, the elongated member may include a projection to engage the second free end portion of the second lever arm, wherein the projection may be protruding from the elongated member in a protrusion direction perpendicular to the longitudinal axis of the elongated member.

According to various embodiments, there is provided an input device for communication with a processor-based device. The input device may include a housing. The input device may further include a scroll wheel which may be rotatably mounted on the housing in a manner such that a part of the scroll wheel may be exposed from the housing for a user of the input device to access the exposed part of the scroll wheel to scroll the scroll wheel. The scroll wheel may include a ring portion and an arresting surface. The arresting surface may be an inner surface of the ring portion. The input device may further include a lever which may be provided with first and second lever arms and which may be mounted on the housing so as to be pivotable about a pivot axis which extends between the first and second lever arms. The lever may be pivotable to move a first free end portion of the first lever arm to engage with the arresting surface of the scroll wheel for the scroll wheel to be in the resistive-wheeling mode and to disengage from the arresting surface of the scroll wheel for the scroll wheel to be in the free-wheeling mode. The input device may further include a motion converter in engagement with a second free end portion of the second lever arm. The motion converter may include a rotary member rotatable about a rotational axis. The motion converter may be configured to convert a rotational movement of the rotary member into an output motion to move the second free end portion of the second lever arm so as to pivot the lever about the pivot axis for engaging or disengaging the first free end portion of the first lever arm and the arresting surface of the scroll wheel. The pivot axis of the lever and the rotational axis of the rotary member of the motion converter may be at least substantially parallel to each other.

According to various embodiments, the rotary member may include a first gear-like portion at a first segment of the rotational axis and a second gear-like portion at a second segment of the rotational axis. The first gear-like portion may include a plurality of teeth-like structure for engaging the second free end portion of the second lever arm to cause the second free end portion of the second lever arm to follow a profile of the plurality of teeth-like structure of the first gear-like portion to move the second free end portion of the second lever arm so as to pivot the lever about the pivot axis.

The second gear-like portion may include a plurality of unsymmetric teeth protruding radially along a circumference of the second gear-like portion for receiving an input motion to rotate the rotary member.

According to various embodiments, the profile of the plurality of teeth-like structure of the first gear-like portion may define: (i) a first engagement surface at a tip of each tooth-like structure disposed at a first radial distance away from the rotational axis, wherein the second free end portion of the second lever arm in engagement with the first engagement surface may correspond to the lever pivoted such that the first free end portion of the first lever arm is engaged with the arresting surface of the scroll wheel for the scroll wheel to be in the resistive-wheeling mode, and (ii) a second engagement surface at a valley between two teeth-like structure disposed at a second radial distance away from the rotational axis, wherein the second free end portion of the second lever arm in engagement with the second engagement surface may correspond to the lever pivoted such that the first free end portion of the first lever arm is disengaged from the arresting surface of the scroll wheel for the scroll wheel to be in the free-wheeling mode.

According to various embodiments, the plurality of teeth-like structure of the first gear-like portion may further define: a further engagement surface disposed at an intermediate radial distance, between the first and second radial distances, away from the rotational axis.

According to various embodiments, a connecting-surface may connect each pair of neighboring first and second engagement surfaces.

According to various embodiments, each of the first engagement surface and the second engagement surface may be shaped to correspond with a shape of the second free end portion of the second lever arm to inter-engage with each other for holding the lever in place According to various embodiments, the input device may further include a biasing element disposed to exert a biasing force on the first free end portion of the first lever arm in a direction towards the arresting surface.

According to various embodiments, the input device may further include a user-input unit including a linear actuation member configured to engage with and impart the input motion to the rotary member to rotate the rotary member about the rotational axis According to various embodiments, the user-input unit may further include a push button for actuating the linear actuation member.

According to various embodiments, the user-input unit may further include a locking mechanism configured to releasably hold the linear actuation member in a retracted position relative to the housing.

While the invention has been particularly shown and described with reference to specific embodiments, it should be understood by those skilled in the art that various changes, modification, variation in form and detail may be made therein without departing from the scope of the invention as defined by the appended claims. The scope of the invention is thus indicated by the appended claims and all changes which come within the meaning and range of equivalency of the claims are therefore intended to be embraced.

The invention claimed is:

1. An input device for communication with a processor-based device, the input device comprising:
 a housing;
 a scroll wheel which is rotatably mounted on the housing in a manner such that a part of the scroll wheel is exposed from the housing for a user of the input device to access the exposed part of the scroll wheel to scroll the scroll wheel, and which comprises a ring portion and an arresting surface, wherein the arresting surface extends along an inner circumference of the ring portion;
 a lever which is provided with first and second lever arms and which is mounted on the housing, wherein the lever is pivotable to move a first free end portion of the first lever arm to engage with the arresting surface of the scroll wheel for the scroll wheel to be in a resistive-wheeling mode and to disengage from the arresting surface of the scroll wheel for the scroll wheel to be in a free-wheeling mode;
 a motion converter comprising a cam surface, wherein the cam surface of the motion converter is configured to engage the second lever arm of the lever; and
 a user-input unit comprising a linear actuation member that is operable so as to pivot the lever to change a mode of the scroll wheel between the resistive-wheeling mode and the free-wheeling mode;
 wherein the linear actuation member is operatively engaged with the motion converter in a manner such that the motion converter changes the mode of the scroll wheel, between the resistive-wheeling mode and the free-wheeling mode, based on one or more actuations of the linear actuation member.

2. The input device of claim 1,
wherein the user-input unit further comprises a locking mechanism configured to releasably hold the linear actuation member in a retracted position relative to the housing, when the linear actuation member is depressed from an extended position to the retracted position relative to the housing.

3. The input device of claim 2,
wherein the locking mechanism comprises a push-push mechanism.

4. The input device of claim 1,
wherein the cam surface of the motion converter is in engagement with a second free end portion of the second lever arm,
wherein the motion converter comprises a rotary member with the cam surface, the rotary member being rotatable about a rotational axis, the motion converter configured to convert a rotational movement of the rotary member into an output motion to move the second free end portion of the second lever arm so as to pivot the lever about the pivot axis for engaging or disengaging the first free end portion of the first lever arm and the arresting surface of the scroll wheel.

5. The input device of claim 4,
wherein the lever is pivotable about a pivot axis which extends between the first and second lever arms;
wherein the pivot axis of the lever and the rotational axis of the rotary member of the motion converter are at least substantially parallel to each other.

6. The input device of claim 4,
wherein the rotary member comprises a first gear-like portion and a second gear-like portion in a side-by-side arrangement along the rotational axis;
wherein the first gear-like portion comprises a plurality of teeth-like structure serving as the cam surface for engaging the second free end portion of the second lever arm to cause the second free end portion of the second lever arm to follow a profile of the plurality of teeth-like structure of the first gear-like portion to move the second free end portion of the second lever arm so as to pivot the lever; and wherein the second gear-like portion comprises a plurality of unsymmetric teeth protruding radially along a circumference of the second gear-like portion for receiving an input motion from the linear actuation member to rotate the rotary member.

7. The input device of claim 6, wherein each unsymmetric tooth of the plurality of unsymmetric teeth of the second gear-like portion of the rotary member comprises a first side wall that is substantially parallel to a radial direction extending from the rotational axis and a second side wall opposite the first side wall, the second side wall being inclined with respect to the first side wall, wherein the first side wall of each unsymmetric tooth of the plurality of unsymmetric teeth faces a same rotational direction about the rotational axis as the first side wall of each other unsymmetric tooth first side wall of the plurality of unsymmetric teeth.

8. The input device of claim 7, wherein the user-input unit further comprises an engagement tab member, the engagement tab member arranged in a manner such that, when the linear actuation member is actuated, the engagement tab member engages and pushes the first side wall of the second gear-like portion of the rotary member to rotate the rotary member about the rotational axis.

9. The input device of claim 6, wherein the second gear-like portion resembles a ratchet teeth gear.

10. The input device of claim 6, wherein the profile of the plurality of teeth-like structure of the first gear-like portion defines:

a first engagement surface at a tip of each tooth-like structure disposed at a first radial distance away from the rotational axis, wherein the second free end portion of the second lever arm in engagement with the first engagement surface corresponds to the lever pivoted such that the first free end portion of the first lever arm is engaged with the arresting surface of the scroll wheel for the scroll wheel to be in the resistive-wheeling mode; and a second engagement surface at a valley between two teeth-like structure disposed at a second radial distance away from the rotational axis, wherein the second free end portion of the second lever arm in engagement with the second engagement surface corresponds to the lever pivoted such that the first free end portion of the first lever arm is disengaged from the arresting surface of the scroll wheel for the scroll wheel to be in the free-wheeling mode.

11. The input device of claim 10, wherein a connecting-surface connects each pair of neighboring first and second engagement surfaces.

12. The input device of claim 10, wherein the first engagement surface and the second engagement surface are arranged in an alternating manner about the rotational axis of the rotary member.

13. The input device of claim 10, wherein the plurality of teeth-like structure of the first gear-like portion further defines:

one or more further engagement surfaces disposed at one or more intermediate radial distances, between the first and second radial distances, away from the rotational axis.

14. The input device of claim 10, wherein each of the first engagement surface and the second engagement surface is shaped to correspond with a shape of the second free end portion of the second lever arm to inter-engage with each other for holding the lever in place.

15. The input device of claim 14, wherein each of the first engagement surface and the second engagement surface defines a concaved surface portion configured to inter-engage with a corresponding convex surface portion of the second free end portion of the second lever arm.

16. The input device of claim 1, wherein the user-input unit further comprises a push button for actuating the linear actuation member.

17. The input device of claim 1, further comprising:

a biasing element disposed to exert a biasing force on the first free end portion of the first lever arm in a direction towards the arresting surface.

18. The input device of claim 1, wherein the ring portion and the arresting surface comprises a plastic material.

19. The input device of claim 1, wherein the lever comprises a plastic material.

\* \* \* \* \*